(12) United States Patent
Tian et al.

(10) Patent No.: US 12,199,851 B2
(45) Date of Patent: Jan. 14, 2025

(54) METHOD, DEVICE, AND STORAGE MEDIUM FOR NDN BASED DATA TRANSFER IN MULTI-PATH NETWORKING ENVIRONMENTS

(71) Applicant: Intelligent Fusion Technology, Inc., Germantown, MD (US)

(72) Inventors: Xin Tian, Germantown, MD (US); Genshe Chen, Germantown, MD (US); Khanh Pham, Kirtland AFB, NM (US); Erik Blasch, Arlington, VA (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 0 days.

(21) Appl. No.: 18/197,330

(22) Filed: May 15, 2023

(65) Prior Publication Data
US 2024/0305551 A1 Sep. 12, 2024

Related U.S. Application Data

(60) Provisional application No. 63/341,889, filed on May 13, 2022.

(51) Int. Cl.
| | | |
|---|---|---|
| G06F 15/173 | (2006.01) | |
| H04L 43/0888 | (2022.01) | |
| H04L 43/106 | (2022.01) | |
| H04L 43/12 | (2022.01) | |

(52) U.S. Cl.
CPC ........ *H04L 43/0888* (2013.01); *H04L 43/106* (2013.01); *H04L 43/12* (2013.01)

(58) Field of Classification Search
CPC .... H04L 43/0888; H04L 43/106; H04L 43/12
USPC .......................................................... 709/224
See application file for complete search history.

(56) References Cited

U.S. PATENT DOCUMENTS

| | | | | |
|---|---|---|---|---|
| 9,270,598 | B1 * | 2/2016 | Oran .................... | H04L 47/629 |
| 10,523,777 | B2 * | 12/2019 | Yeh ........................ | H04L 45/64 |
| 10,917,328 | B2 * | 2/2021 | Jha ........................ | H04L 45/306 |
| 2020/0162574 | A1 * | 5/2020 | Yeh ........................ | H04L 67/568 |
| 2022/0182334 | A1 * | 6/2022 | Kang .................... | G06F 9/547 |

* cited by examiner

*Primary Examiner* — Alicia Baturay
(74) *Attorney, Agent, or Firm* — ANOVA LAW GROUP, PLLC

(57) ABSTRACT

Embodiments of the present disclosure provide a method of a burst-based route discovery process. The method includes sending a probing interest packet to an NDN network; when one NDN forwarder receives the probing interest packet from a corresponding face, sending the probing interest packet to neighboring NDN forwarders; after anyone NDN forwarder receives the probing interest packet, sending back a burst of K probing data packets; as the burst of K probing data packets being received by an NDN forwarder, evaluating gaps between arrival times of the burst of K probing data packets; determining an available network throughput level of a face of the NDN forwarder; and if determined available network throughput level indicates a predefined increase in network throughput, setting the face of the NDN forwarder as a face for forwarding interest packets; and sending the burst of K probing data packets to neighboring NDN forwarders.

18 Claims, 16 Drawing Sheets

```
┌─────────────────────────────────────────────────────────────────┐
│ Sending, by the data consumer, a probing interest packet using │
│ a probing name for the namespace to the NDN network, where the │──S100
│ NDN network includes interconnected NDN forwarders             │
└─────────────────────────────────────────────────────────────────┘
                                 │
┌─────────────────────────────────────────────────────────────────┐
│ When one NDN forwarder, which is not the data source or not    │
│ directly connected to the data source in the NDN network,      │
│ receives the probing interest packet from one face of the one  │──S102
│ NDN forwarder, sending, by the one NDN forwarder, the probing  │
│ interest packet to neighboring NDN forwarders                  │
└─────────────────────────────────────────────────────────────────┘
                                 │
┌─────────────────────────────────────────────────────────────────┐
│ After anyone NDN forwarder, which is the data source or        │
│ directly connected to the data source, receives the probing    │
│ interest packet through one face of the anyone NDN forwarder,  │──S104
│ sending back, by the anyone NDN forwarder, a burst of K probing│
│ data packets corresponding to the probing interest packet using│
│ the one face of the anyone NDN forwarder, where K is a         │
│ positive integer                                                │
└─────────────────────────────────────────────────────────────────┘
                                 │
┌─────────────────────────────────────────────────────────────────┐
│ As the burst of K probing data packets being received by an    │
│ NDN forwarder which is not the data source or not directly     │
│ connected to the data source from a face of the NDN forwarder, │──S106
│ evaluating one or more gaps between arrival times of the burst │
│ of K probing data packets received                              │
└─────────────────────────────────────────────────────────────────┘
                                 │
┌─────────────────────────────────────────────────────────────────┐
│ Determining an available network throughput level of the face  │
│ of the NDN forwarder based on the one or more gaps between the │──S108
│ arrival times of the burst of K probing data packets received  │
└─────────────────────────────────────────────────────────────────┘
                                 │
┌─────────────────────────────────────────────────────────────────┐
│ If determined available network throughput level of the face   │
│ of the NDN forwarder indicates a predefined increase in network│
│ throughput comparing to a previously determined available      │
│ network throughput level of a current face of the NDN forwarder│
│ configured for forwarding the interest packets in the          │
│ namespace, setting the face of the NDN forwarder for the burst │
│ of K probing data packets received as a face of the NDN        │──S110
│ forwarder for forwarding the interest packets in the namespace;│
│ and sending the burst of K probing data packets to neighboring │
│ NDN forwarders, where the burst of K probing data packets is   │
│ sent in a manner such that one or more sending time gaps       │
│ between the burst of K probing data packets are consistent with│
│ the one or more gaps between the arrival times of the burst of │
│ K probing data packets                                          │
└─────────────────────────────────────────────────────────────────┘
```

FIG. 1

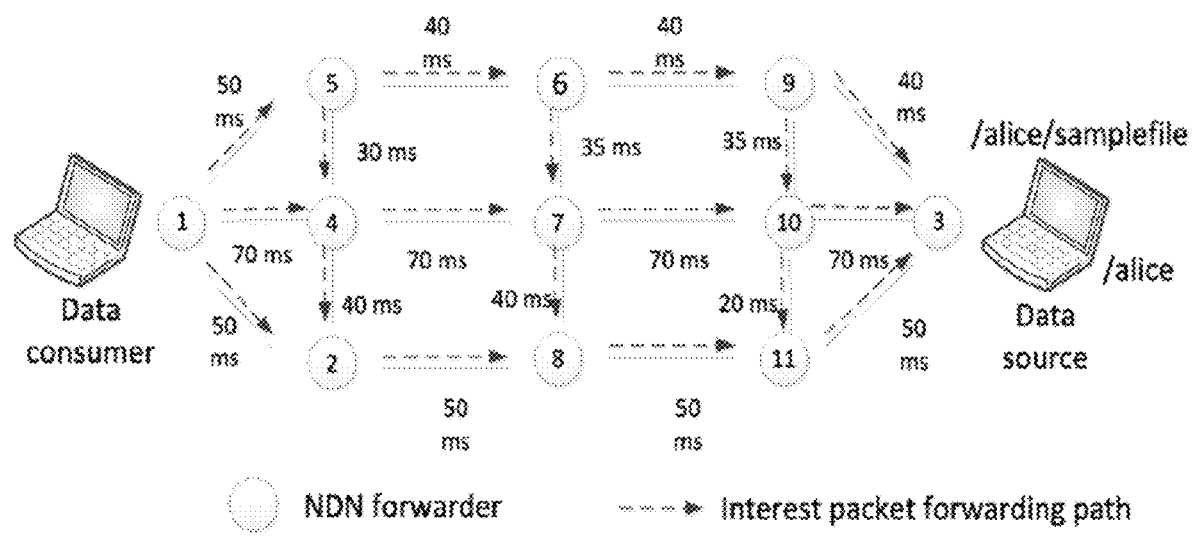
FIG. 5
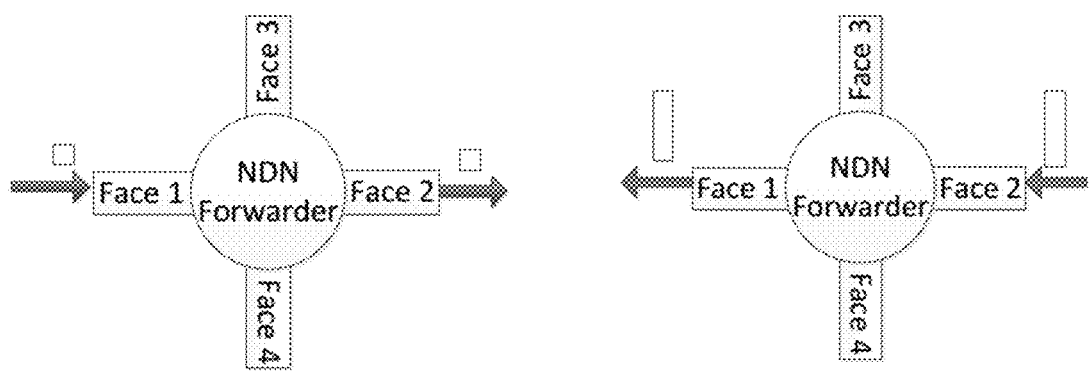
FIG. 6A  FIG. 6B

METHOD, DEVICE, AND STORAGE MEDIUM FOR NDN BASED DATA TRANSFER IN MULTI-PATH NETWORKING ENVIRONMENTS

CROSS-REFERENCE TO RELATED APPLICATION

This application claims the priority of U.S. Provisional Application No. 63/341,889, filed on May 13, 2022, the content of which is incorporated herein by reference in its entirety.

GOVERNMENT RIGHTS

The present disclosure was made with Government support under Contract No. FA9453-21-C-0554, awarded by the United States Air Force Research Laboratory. The U.S. Government has certain rights in the present disclosure.

FIELD OF THE DISCLOSURE

The present disclosure generally relates to the field of networking technology and, more particularly, relates to a method, a device and a storage medium of a burst-based route discovery process.

BACKGROUND

Named data networking (NDN) is a new networking architecture that offers key advantages over the Internet Protocol (IP) based networking. IP based networking relies on establishment of end-to-end connections through a network. Each IP packet contains a source IP address and a destination IP address. Routers in the IP based network forward IP packets to their destinations based on destination IPs. In contrast, NDN, which is not based on establishing the end-to-end network connection, focuses on directly obtaining data from the network, that is, directly retrieves data from network interest packets regardless of data location. In NDN, a unique name may be assigned to each NDN data packet. To obtain an NDN data packet, a data consumer may send an interest packet using the name to the NDN network requesting the NDN data packet with same NDN name. NDN data packets with unique names may be stored at any network nodes and retrieved from the network with corresponding interest packets. As a result, availability and accessibility of named data may be greatly enhanced, thereby offering potential advantages in delivery time and speed and saving network bandwidth.

The NDN network may be formed by interconnected NDN forwarders (e.g., routers). When receiving an NDN interest packet from a network interface (i.e., face), an NDN forwarder may first check if corresponding NDN data is available in its local content store by the NDN data's name. If the NDN data is available in its content store, the NDN forwarder may send the NDN data packet back to the incoming interface of the NDN interest packet, and the NDN interest packet is satisfied. If the required NDN data is not available in the content store of the NDN forwarder, the NDN forwarder may add the NDN interest packet in a pending interest table (PIT) which stores unsatisfied NDN interest packets and their incoming interfaces. Therefore, in order to search for the NDN data packet, the NDN interest packet may be forwarded (based on a forwarding strategy used by the NDN forwarder for the name) to other NDN forwarders using one or more network interfaces (i.e., faces of the NDN forwarder).

When receiving an NDN data packet, the NDN forwarder may check its PIT to determine the network interfaces that should be configured to forward the NDN data packet. As a result, the NDN data packet may be sent back to the NDN data consumer by tracing back the route of the NDN interest packet.

BRIEF SUMMARY OF THE DISCLOSURE

One aspect or embodiment of the present disclosure provides a method of a burst-based route discovery process for establishing a forwarding path for forwarding interest packets in a namespace from a data consumer to a data source through a named data networking (NDN) network. The method includes sending, by the data consumer, a probing interest packet using a probing name for the namespace to the NDN network, where the NDN network includes interconnected NDN forwarders; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Another aspect or embodiment of the present disclosure provides a method of a burst-based route discovery process for establishing a forwarding path for forwarding interest packets in a namespace from a data consumer to a data source through a named data networking (NDN) network, where the NDN network includes interconnected NDN forwarders. The method includes sending a probing interest packet, using a probing name for the namespace to the NDN network, by one of the NDN forwarders which is directly connected to the data consumer of NDN data in the namespace; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Another aspect or embodiment of the present disclosure provides a method for recovering named data networking (NDN) data transmission in a namespace in an NDN network when an NDN forwarder detects a break of a data transmission flow in the namespace. The method includes sending by the NDN forwarder, which detects the break of the data transmission flow, a failure notification interest packet corresponding to the namespace using one or more faces of the NDN forwarder from which interest packets in the namespace are received; and when one of NDN forwarders in the NDN network receives the failure notification interest packet corresponding to the namespace, if the one of the NDN forwarders is not directly connected to a data consumer of NDN data in the namespace, sending, by the one of the NDN forwarders, the failure notification interest packet using one or more faces of the one of the NDN forwarders from which interest packets in the namespace are received; or if the one of the NDN forwarders is directly connected to a data consumer of NDN data packets in the namespace, establishing a new forwarding path for the namespace in the NDN network.

Another aspect or embodiment of the present disclosure provides a device for a burst-based route discovery process. The device includes a memory, configured to store program instructions for performing a method of a burst-based route discovery process for establishing a forwarding path for forwarding interest packets in a namespace from the data consumer to a data source through a named data networking (NDN) network; and a processor, coupled with the memory and, when executing the program instructions, configured for: sending, by the data consumer, a probing interest packet using a probing name for the namespace to the NDN network, where the NDN network includes interconnected NDN forwarders; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Another aspect or embodiment of the present disclosure provides a non-transitory computer-readable storage medium, containing program instructions for, when being executed by a processor, performing a method of a burst-based route discovery process for establishing a forwarding path for forwarding interest packets in a namespace from the data consumer to a data source through a named data networking (NDN) network. The method includes sending, by the data consumer, a probing interest packet using a probing name for the namespace to the NDN network, where the NDN network includes interconnected NDN forwarders; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Other aspects or embodiments of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 1 depicts an exemplary method for a burst-based route discovery process according to various disclosed embodiments of the present disclosure.

FIG. 5 depicts an exemplary route discovery process in an NDN network according to various disclosed embodiments of the present disclosure.

FIGS. 6A-6B depict exemplary interest packet and data packet processing in a regular data transfer mode by an NDN forwarder according to various disclosed embodiments of the present disclosure.

DETAILED DESCRIPTION

Figure 2:
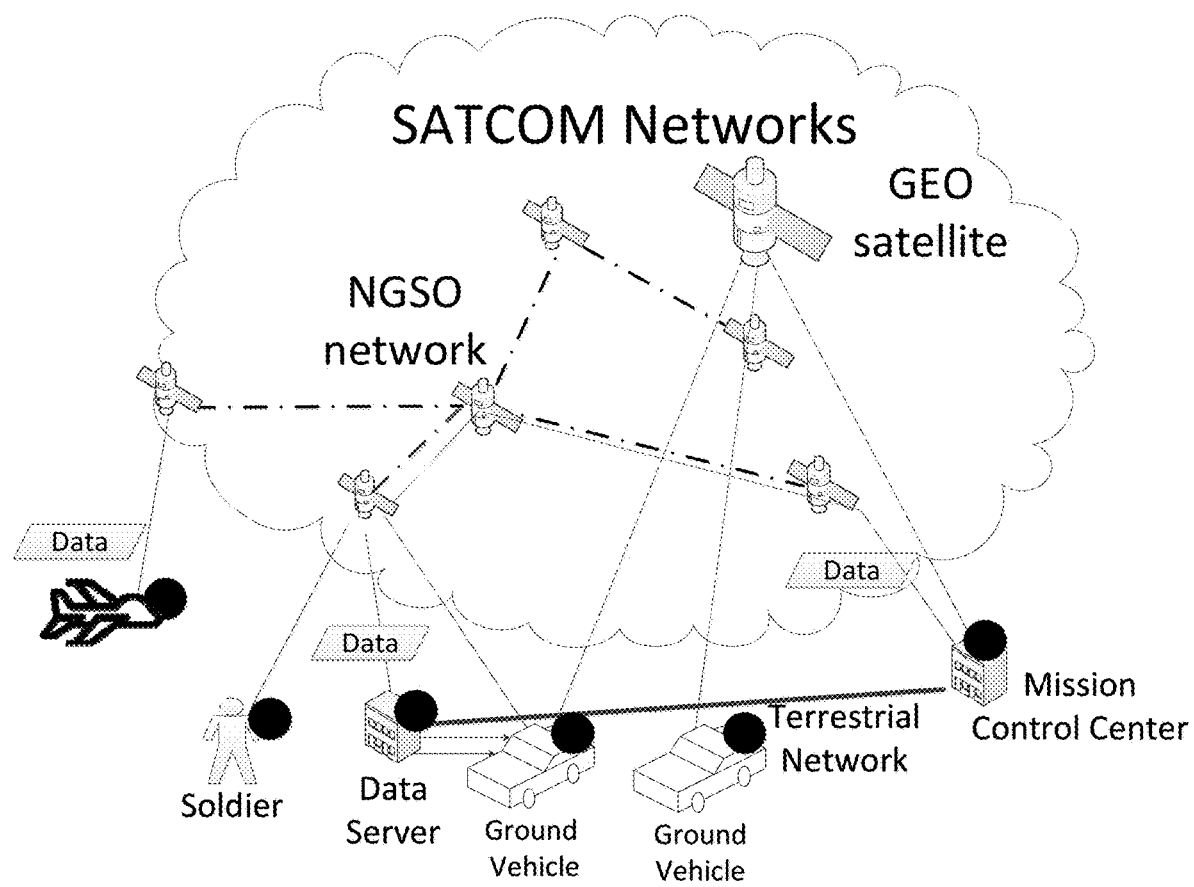
FIG. 2 depicts an exemplary system including units connected by one or more SATCOM and non-SATCOM networks according to various disclosed embodiments of the present disclosure.

References may be made in detail to exemplary embodiments of the disclosure, which may be illustrated in the accompanying drawings. Wherever possible, same reference numbers may be used throughout the accompanying drawings to refer to same or similar parts.

Named data networking may present various advantages over IP based networking. One advantage of NDN is that named data packets may be cached in content stores of NDN forwarders of the NDN network. As a result, availability of named data from the network may be greatly improved. In addition, the NDN data consumer may obtain named data from the closest/fastest NDN forwarder that has the named data, thereby resulting into network bandwidth saving and network delay reduction. Furthermore, NDN may operate in challenging network conditions that network connections are unstable to be changed quickly over time and end-to-end network connections are difficult to maintain or not available. NDN, a stateful networking technology, may effectively detect network looping, measure network performance (e.g., round trip time (RTT)) and network throughput when NDN interest packets and data packets are transferred. These real-time network performance measurements may allow optimization of NDN packet forwarding to achieve enhanced networking performance. NDN may also offer advantages in data security. For example, security may be directly applied to named data packets; and secured NDN data packets may be safely sent and stored over public communication networks.

NDN may effectively combine resources and capabilities (e.g., network throughputs) of various communication networks or connections. To form the NDN network, NDN forwarders may be connected by heterogeneous communication links, including direct physical layer links, transport layer links (e.g., user datagram protocol (UDP)), and TCP connections through communication networks. The communication networks or connections may be different types from different vendors. The NDN network may effectively combine all networking capabilities available to achieve enhanced networking performance.

Various embodiments of the present disclosure provide a method, a device, and a storage medium for a burst-based route discovery process.

FIG. 1 depicts an exemplary method for the burst-based route discovery process according to various disclosed embodiments of the present disclosure.

The method of a burst-based route discovery process is configured for establishing a forwarding path for forwarding interest packets in a namespace from a data consumer to a data source through an NDN network.

In S100, a probing interest packet is sent by the data consumer using a probing name for the namespace to the NDN network, where the NDN network includes interconnected NDN forwarders.

In S102, when one NDN forwarder, which is not the data source or not directly connected to the data source in the NDN network, receives the probing interest packet from one face of the one NDN forwarder, the probing interest packet is sent by the one NDN forwarder to neighboring NDN forwarders.

In S104, after anyone NDN forwarder, which is the data source or directly connected to the data source, receives the probing interest packet through one face of the anyone NDN forwarder, a burst of K probing data packets corresponding to the probing interest packet is sent back by the anyone NDN forwarder using the one face of the anyone NDN forwarder, where K is a positive integer.

In S106, as the burst of K probing data packets being received by an NDN forwarder which is not the data source or not directly connected to the data source from a face of the NDN forwarder, one or more gaps between arrival times of the burst of K probing data packets received are evaluated.

In S108, an available network throughput level of the face of the NDN forwarder is determined based on the one or more gaps between the arrival times of the burst of K probing data packets received.

In S110, if determined available network throughput level of the face of the NDN forwarder indicates a predefined increase in network throughput comparing to a previously determined available network throughput level of a current face of the NDN forwarder configured for forwarding the interest packets in the namespace, the face of the NDN forwarder for the burst of K probing data packets received is set as a face of the NDN forwarder for forwarding the interest packets in the namespace; and the burst of K probing data packets is sent to neighboring NDN forwarders, where the burst of K probing data packets is sent in a manner such that one or more sending time gaps between the burst of K probing data packets are consistent with the one or more gaps between the arrival times of the burst of K probing data packets.

In one embodiment, evaluating the one or more gaps between the arrival times of the burst of K probing data packets received includes calculating a gap between an arrival time of a first packet and an arrival time of a last packet of the burst of K probing data packets.

In one embodiment, if the burst of K probing data packets is delayed to a time duration, the forwarding path for forwarding the interest packets is not updated.

In one embodiment, a large gap between the arrival times of the burst of K probing data packets indicates a low available network throughput level from the data source to the NDN forwarder; and a small gap between the arrival times of the burst of K probing data packets indicates a high available network throughput level from the data source to the NDN forwarder.

FIG. 2 depicts an exemplary system including units connected by one or more SATCOM (satellite communication) and non-SATCOM networks according to various disclosed embodiments of the present disclosure. FIG. 2 illustrates a potential exemplary interest scenario using SATCOM and non-SATCOM networks. A mission may include a group of units such as unmanned aerial vehicles (UAVs), ground vehicles, ground troop, data/control center and the like. Each member may have a communication terminal with access to one or more IP-based networks, including Geostationary orbit (GEO) SATCOM networks, non-Geostationary orbit (NGSO) SATCOM networks, mobile wireless networks, and the like. An NDN network may be established by running NDN forwarders at the units indicated by the circles in FIG. 2. The NDN forwarders (e.g., nodes) may be connected by UDP connections through underlay IP networks. It should be noted that satellite nodes may run NDN forwarders and become nodes in the overlay NDN network. However, permission and collaboration of the owners/operators of the SATCOM systems may be required, which may be not feasible in actual applications.

Figure 3:
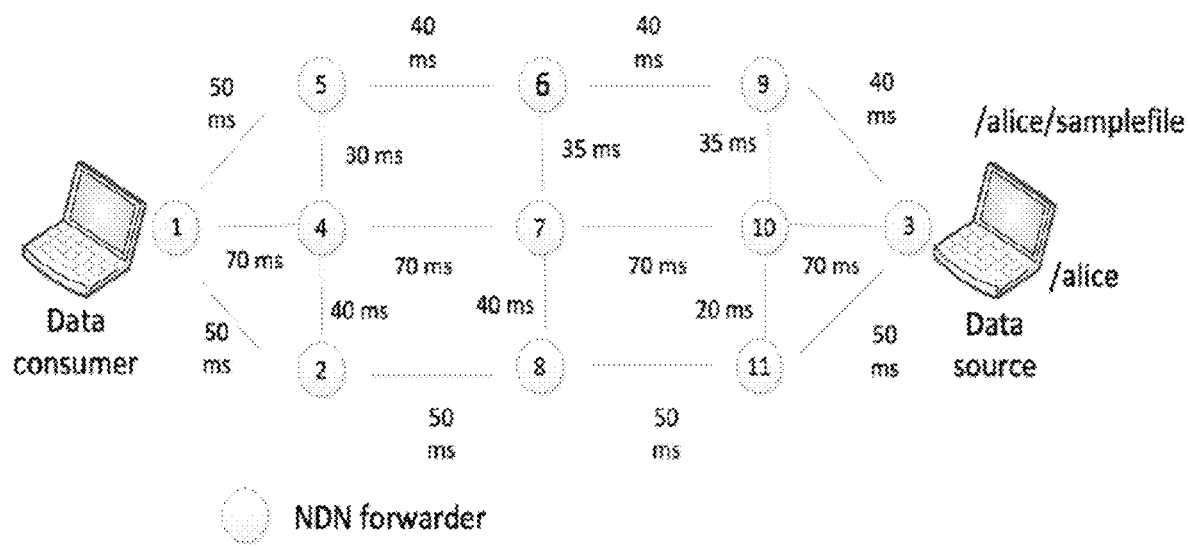
FIG. 3 depicts an exemplary multi-path NDN network according to various disclosed embodiments of the present disclosure.

FIG. 3 depicts an exemplary multi-path NDN network according to various disclosed embodiments of the present disclosure. The NDN network may be a network of NDN forwarders (i.e., nodes) connected by underlay IP networks. Referring to FIG. 3, a multi-path networking environment where one or more network paths are available may be between two NDN network forwarders. Although there is no control of routing and behavior of underlay IP networks, routing and behavior of the overlay NDN network may be controlled and optimized to meet quality of service (QOS) requirements of user applications. The NDN overlay network may be effectively configured to combine capabilities of the underlay network (or networks) to achieve significantly enhanced networking performance. For example, without the NDN overlay network, IP-based data transfer from one user node to another user node may use an end-to-end network connection between two nodes through one or more networks. The throughput for data transfer between two network nodes may be limited by the throughput of the end-to-end network connection.

Referring to FIG. 3, the NDN network may be a multi-path networking environment. Multiple network paths may be between an NDN data consumer (node) and a potential data source (node). Network throughput for data transfer may be greatly enhanced when network throughputs from multiple paths are simultaneously utilized.

Considering a basic NDN file transfer scenario, a data source for a file with the name/alice/samplefile may be available at the NDN forwarder 3 (i.e., node 3) of the NDN network in FIG. 3. The data consumer at the NDN forwarder 1 (i.e., node 1) may try to obtain the NDN data file through the NDN network. In the NDN file transfer, a large file may be divided into a number of data segments. Each segment may be stored as an NDN data packet with a unique name in the file's namespace (i.e., /alice/samplefile/), formed by the file name and a corresponding segment id (e.g., /alice/samplefile/seg9).

Figure 4:
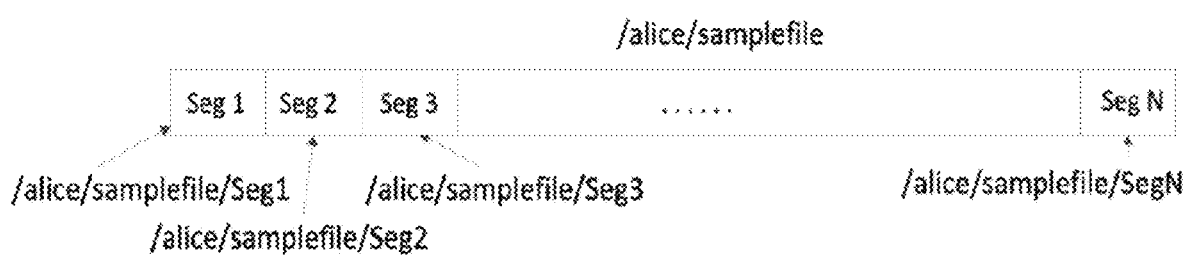
FIG. 4 depicts exemplary NDN namespace for a data file and names of named data packets corresponding to segments of the data file according to various disclosed embodiments of the present disclosure.

FIG. 4 depicts an exemplary NDN file name and names for named data packets corresponding to data segments of the file in its namespace according to various disclosed embodiments of the present disclosure. Referring to FIG. 4, the NDN file with the name/alice/samplefile and named data packets of the file with the NDN data segments (e.g., packets) with names in the file's namespace (i.e., /alice/samplefile/) is illustrated. To obtain the NDN data packets, a data consumer may send interest packets with names of the corresponding data segments to the NDN network to request the NDN data segments of the file. For example, for the data consumer to obtain the file with name/alice/samplefile from the NDN network, the data consumer may send NDN interest packets with names of the file segments, e.g., /alice/samplefile/seg1, /alice/samplefile/seg2, ..., and/alice/samplefile/segN, to the NDN network (which includes interconnected NDN forwarders). When an NDN forwarder receives the interest packet, the NDN forwarder first checks its local content store. If the corresponding NDN data packet of the file segment is found in local content store, matched NDN data packet may be sent through the incoming face of corresponding interest packet to satisfy the interest packet. If there is no match to the interest packet in the content store of the NDN forwarder, the interest packet may be forwarded according to routing information in the forwarding information database (FIB) of the NDN forwarder for its namespace. The FIB may have zero, one or multiple forwarding faces for interest packets in the file's namespace (e.g., /alice/samplefile/seg1, /alice/samplefile/seg2, ..., and/alice/samplefile/segN). When there is no matching forwarding face for interest packets in the namespace, a route discovery process may be started to establish a forwarding route for the namespace in the NDN network.

FIG. 5 depicts an exemplary route discovery process in a multi-path NDN network according to various disclosed embodiments of the present disclosure. The route discovery process in the multi-path NDN network is described according to various embodiments of the present disclosure herein. Referring to FIG. 5, a route discovery process may start from broadcasting an interest packet with a name in the namespace in the NDN network. When the NDN interest packet, e.g., an interest packet with name/alice/samplefile/seg1, reaches an NDN forwarder that is connected to a data source (e.g., node 3), the NDN data packet with corresponding name, /alice/samplefile/seg1, may be sent back to the face from which the NDN interest packet is received. In a multi-path NDN network, an NDN forwarder may receive multiple NDN data packets with a same name returning from different faces. Each face may be a next hop candidate for forwarding interest packets with names in the same namespace (e.g., /alice/samplefile).

In the route discovery, it also is important to determine which face or faces should be used for forwarding NDN interest packets in the namespace. According to various embodiments of the present disclosure, the burst-based route discovery process for the multi-path NDN network is provided. Such a process may determine faces providing high network throughput from a NDN data source to the NDN data consumer under the current network condition.

As disclosed, the operation of the NDN forwarder may have two modes including a regular data transfer mode and a route discovery mode. FIGS. 6A-6B depict exemplary interest packet and data packet processing in the regular data transfer mode by the NDN forwarder according to various disclosed embodiments of the present disclosure. In the regular data transfer mode, the NDN forwarder may know which face(s) should be configured to forward the interest packet based on the name, such that the NDN data source may be reached. The behavior of the NDN forwarder node in the regular data transfer mode is illustrated in FIGS. 6A-6B.

Referring to FIG. 6A, the interest packet denoted as a square may first arrive from a face (for example, face 1) of the NDN forwarder; when corresponding named data packet is not found in the content store of the NDN forwarder, the interest packet may become a pending interest at the NDN forwarder and be stored in the PIT of the NDN forwarder. The interest packet may be then forwarded to next hop through a face (for example, face 2) according to routing information in the FIB of the NDN forwarder for the name. When the NDN data packet corresponding to the interest packet (denoted as a rectangle) is sent back from a face of the NDN forwarder, e.g., face 2, as shown in FIG. 6B, the NDN forwarder may send the NDN data packet to face 1, thereby satisfying the pending interest.

In the route discovery mode, the NDN forwarder does not know which face(s) may lead to an NDN data source for the name. To discover the route for forwarding interest packets in the namespace, the NDN forwarder may forward an interest packet (not satisfied by a named data packet in its local content store) to all possible faces that may be a potential next hop leading to the NDN data source.

Figure 7:
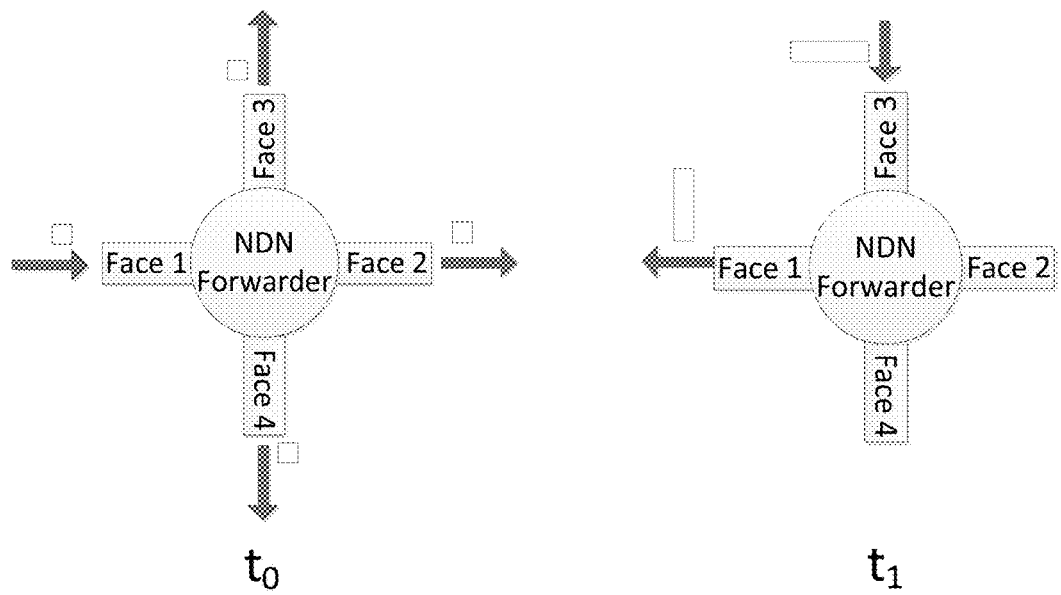
FIG. 7 depicts interest packet and data packet processing in a route discovery mode by an NDN forwarder according to various disclosed embodiments of the present disclosure.

FIG. 7 depicts interest packet and data packet processing in the route discovery mode by an NDN forwarder according to various disclosed embodiments of the present disclosure. In the route discovery mode, the routing/forwarding path (next hop) for interest packets under a namespace or name prefix (e.g., /alice/samplefile) may be not determined yet at the NDN forwarder. In order to discover the route to the NDN data source, at time t0 shown in FIG. 7, after receiving an interest packet (e.g., an interest packet with name/alice/samplefile/seg1) from a face (for example, face 1), the NDN forwarder (illustrated in FIG. 7) may broadcast the interest packet through all other available faces to all neighboring NDN forwarders in the NDN network. As a result, the interest packet may be broadcasted over the NDN network and reach a source having corresponding NDN data packet (e.g., the NDN data packet with name/alice/samplefile/seg1). At time t1, the NDN data packet may return to same NDN forwarder (illustrated in FIG. 7) from a face (for example, face 3) of the NDN forwarder by tracing back the path of the interest packet through the NDN network As a result, it can be determined that face 3 of the NDN forwarder may lead to a next hop to the NDN data source for interest packets in the same namespace (e.g., /alice/samplefile). At this point, the NDN data packet may be sent back through face 1 and previous pending interest for the name may be satisfied. In a multi-path NDN network, NDN data packets with same name may return from another face (for example, face 2) at time t2. In such case, face 2 may also lead to an NDN. A simple way to determine the routing path for the namespace (e.g., /alice/samplefile/) is to use the face from which the first retuning NDN data packet was received (e.g., face 3 in one embodiment) as the forwarding path for interest packets in the namespace, which may lead to a path with a minimum network delay.

Although the basic route discovery mode illustrated above is capable of finding one or more routes to NDN data source(s), the routes may only be distinguished by network delay. For data transfer, it is more important to identify network routes that provide high network throughput levels. The burst-based route discovery process may determine, for an NDN namespace, a forwarding path or route in the NDN network that offers high network throughput for transferring NDN data from an NDN data source to a data consumer.

Figure 8A:
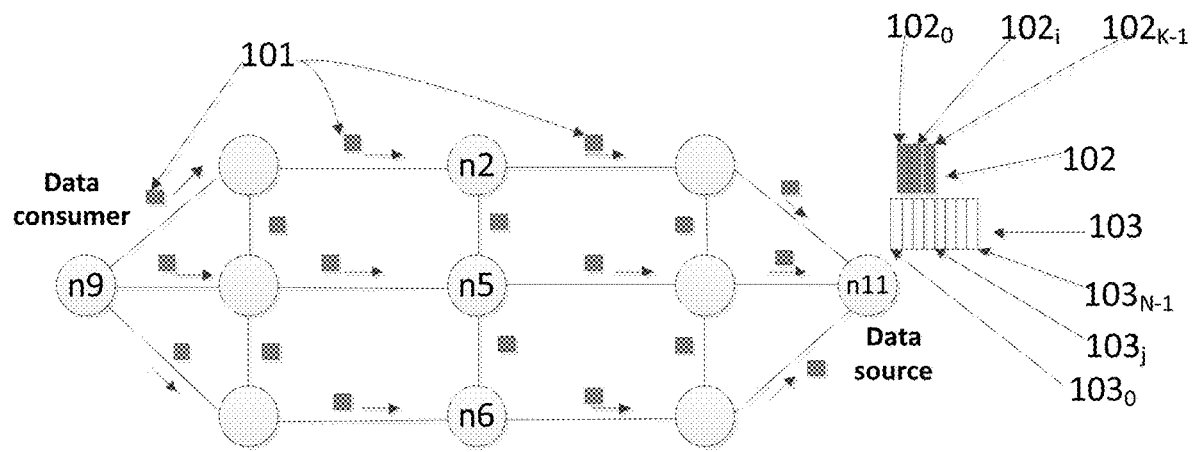
FIGS. 8A-8B depict a burst-based route discovery process for a multi-path NDN network according to various disclosed embodiments of the present disclosure.
Figure 8B:
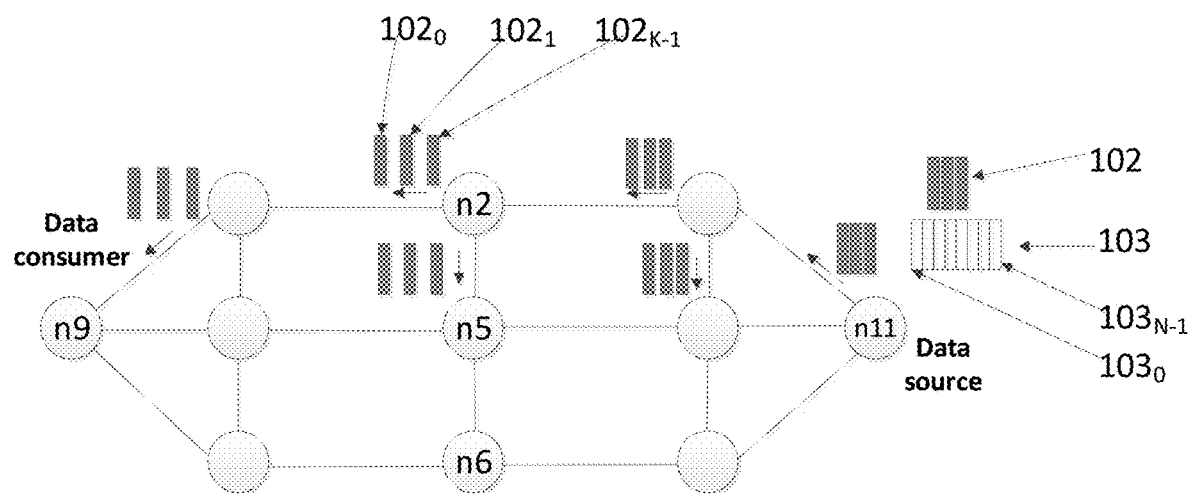

FIGS. 8A-8B depict the burst-based route discovery for a multi-path NDN network according to various disclosed embodiments of the present disclosure. In one embodiment, referring to FIGS. 8A-8B, the data consumer may try to obtain the NDN data file with the name/alice/samplefile. The actual file data 103 may be published to the NDN network in a namespace/alice/samplefile/filedata with N named data packets $103_0$ to $103_{N-1}$. Each named data packet corresponds to a segment of the file data $103_j$, which may have a name/alice/samplefile/filedata/seg=j, where j is id of the file segment. In addition to the N named data packets, a burst of K NDN probing data packets 102 indicated by gray rectangles may also be published at the data source node under a namespace/alice/samplefile/brst to support network probing, which may have K named data packets $102_0$ to $102_{K-1}$ from/alice/samplefile/brst/seg=0 to/alice/samplefile/brst/seg=K−1. It should be noted that the probing namespace/alice/samplefile/brst may be associated with the namespace of the actual data file/alice/samplefile/filedata. A special probing interest packet 101, with the NDN name/alice/samplefile/brst/probe, illustrated using a gray square 101 in FIG. 8A, may be used for network probing. It should be noted that the probing interest name/alice/samplefile/brst/probe may be associated with the probing namespace, i.e., /alice/samplefile/brst and the namespace of the data file, i.e., /alice/samplefile/filedata. Conveniently, these names may be designed to be all in the namespace of the file with the same name prefix (i.e., /alice/samplefile in one example).

Referring to FIG. 8A, to initiate the burst-based network probing process, the probing interest packet 101 with the NDN name/alice/samplefile/brst/probe may be sent by the data consumer (at node n9) to the NDN network.

It should be noted that, in some embodiments of disclosed method, the burst-based network probing process may not be initiated by the data consumer. Instead, the process may be initiated by an NDN forwarder that directly connects to the data consumer by sending the probing interest packet to its neighboring NDN forwarders.

When an NDN forwarder in the NDN network receives the probing interest packet 101, it may send the probing interest packet to its neighboring NDN forwarders (except the neighboring NDN forwarder from which the probing interest is received). As a result, the probing interest packet may be broadcasted in the NDN network. As shown in FIG. 8B, after the probing interest packet reaches a data source for the file/alice/samplefile (e.g., at node n11) with the NDN data packets of the file data (e.g., file data packets with names/alice/samplefile/filedata/seg=j, where j=0, . . . , N-1) $103_0$ to $103_{N-1}$, the data source node may send back the burst of K probing data packets (e.g., probing data packets with name/alice/samplefile/brst/seg=i, where i=0 . . . . K-1) $102_0$ to $102_{K-1}$ in response to the probing interest packet 101. As illustrated in FIG. 8B, the burst of K probing data packets $102_0$ to $102_{K-1}$ may be sent through the NDN network from the NDN forwarder at the data source node (e.g., node n11) to the NDN forwarder at the data consumer side (e.g., node n9). As the burst of K probing data packets $102_0$ to $102_{K-1}$ being sent through a network connection from an NDN forwarder to a neighboring NDN forwarder, the gap(s) between arrival times of the burst of K probing data packets at the receiving NDN forwarder may provide a measure of available throughput in the network connection. When the burst of K probing data packets $102_0$ to $102_{K-1}$ is sent through a high throughput network connection, the gap(s) between the arrival times of the data packets may have small difference(s) from the gap(s) between the corresponding sending times of the data packets. When the burst of K probing data packets is sent through a low throughput network connection, the gap(s) between the arrival times of the data packets may be significant larger than the gap(s) of corresponding sending times of the data packets.

Figure 9:
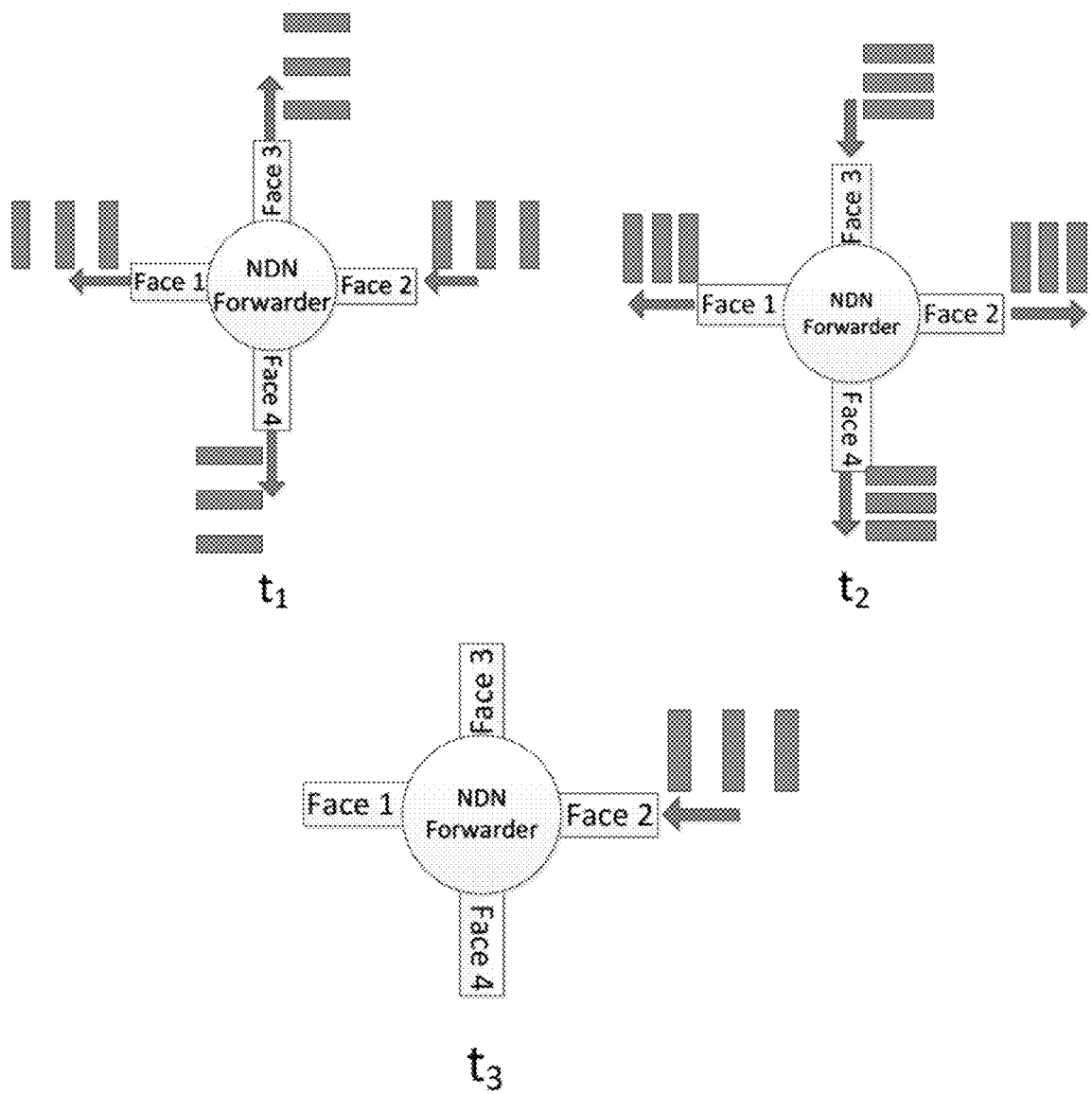
FIG. 9 depicts a processing of a burst of probing data packets by an NDN forwarder according to various disclosed embodiments of the present disclosure.

FIG. 9 depicts the processing of a burst of network probing data packets by an NDN forwarder according to various disclosed embodiments of the present disclosure. After the NDN forwarder receives the burst of K probing data packets from one of its face, for example, at time t1 from face 2, the gap(s) of the arrival times may be used to evaluate a level of available network throughput from the NDN source node to the NDN forwarder through the receiving face (e.g., face 2). A simple method for evaluating the level of available network throughput may use the difference (gap) between the arrival time of the first packet of burst $102_0$ (e.g., packet/alice/samplefile/brst/seg=0) and the arrival time of the last packet of burst $102_{K-1}$ (e.g., packet/alice/samplefile/brst/seg=K-1). If it is determined that the receiving face provides sufficient improvement in network throughput (based on the evaluated available network throughput level) comparing to current face set for forwarding interest packets in the file data namespace (e.g., /alice/samplefile/filedata), the forwarding face for interest packets in the file data's namespace may be updated as new incoming face of the burst data packets, which is face 2 at time $t_1$ in one embodiment. It should be noted that, for the differences/gaps between arrival times of the probing data packets to reflect more accurately available throughput of the network route from the data source to the NDN forwarder, the size of the last packet of the K probing data packets may be chosen to be as small as possible. The reason is that, if the size of the last, e.g., K-1, probing data packet $102_{K-1}$ is large, the arrival time of the last packet may be more affected by the throughput of the network connection between the receiving NDN forwarder and its neighboring forwarder that sent the burst of K probing data packets instead of the throughput of the network route from the data source to the receiving NDN forwarder. Furthermore, the size of the first packet of the K network probing data packets $102_0$ may be chosen as small as possible to save cost on network throughput of the network probing process, because the size of the first network probing data packet has no impact on the time gaps between the arrival times of the network probing data packets. It should be noted that the arrival time of a network probing data packet at a NDN forwarder is the time when the NDN forwarder received whole probing data packet.

In order to pass on the network throughput information in the NDN network, the NDN forwarder node may send the received burst of K probing data packets to its neighboring NDN forwarders (excluding the one neighboring forwarder from which the burst of network probing data packets is received). The burst of K probing data packets may be sent such that sending time gaps between the K probing data packets should be same/consistent with gaps of corresponding arrival times.

If the evaluated available network throughput level based on the arrival time gaps of the K probing data packets $102_0$ to $102_{K-1}$ indicates that the network route does not provide sufficient improvement in network throughput, update of the forwarding path/face for the corresponding file data's namespace may be not needed, and received data burst may be not forwarded to any neighboring forwarders in the NDN network.

To further illustrates the burst-based route discovery process, referring to FIG. 9, at time t1, the NDN forwarder may receive the first burst of probing data packets $102_0$ to $102_{K-1}$ from face 2, which indicates that face 2 leads to a route to the NDN data source for associated file data's namespace (e.g., /alice/samplefile/datafile). An available network throughput level from the face may be evaluated according to gaps of the arrival times of the probing data packets. The forwarding face for interest packets in the data file's namespace (e.g., /alice/samplefile/datafile) may be set as face 2 by the forwarder. The burst of probing data packets may be forwarded to neighboring NDN forwarders (except face 2 which is the probing packets' incoming face at time t1) with the time gap(s) between the burst of data packets being consistent with the time gaps between their corresponding arrival times. At time t2 which is after t1, another burst of probing data packets may be received from face 3 of the same NDN forwarder. The gaps between arrival times of the burst of probing data packets at t2 may be smaller than the gaps at t1. As a result, face 3 may be updated as the new forwarding face. The burst of probing data packets $102_0$ to $102_{K-1}$ may be forwarded to neighboring NDN forwarders (except face 3). When sending the probing data packets, time gap(s) between the burst of data packets should be consistent with the gaps between their corresponding arrival times at t2. At time t3 which is after t2, another burst of probing data packets may be received by same forwarder (i.e., receiver) from a face (i.e., face 2). The burst of probing data packets may have larger gap(s) in arrival time, which corresponds to a lower available network throughput level. As a result, the forwarding face at the NDN forwarder for the file data's namespace may not be updated at t3, and the probing data packets received at t3 may not be forwarded to neighboring NDN forwarders.

Referring to FIG. 8B, when the probing data packet burst $102_0$ to $102_{K-1}$ reaches the data consumer (e.g., node n9 in one embodiment), a full routing path for the file data's namespace (e.g., /alice/samplefile/datafile) to the source node (e.g., node n11 in one embodiment) may be established. As more probing data packet bursts reach the data consumer from other network paths, the routing path may be updated for improved data transfer throughput. Furthermore, it should be noted that, according to disclosed route discovery process, as the probing data packet burst is sent or forwarded from one NDN forwarder to another NDN forwarder, sending/arrival time gaps between the burst packets may only increase, which may eliminate the possibility of looping of the burst of probing data packets in the NDN network.

Comparing to routers in IP based network, the NDN forwarders may quickly detect network anomalies such as breaks of NDN data transfer flow. A method for quick recovery of NDN data transfer in the NDN network in cases of interrupted network connections is provided in the present disclosure. According to various embodiments of the present disclosure, the method is described in detail herein. When an NDN forwarder in the NDN network detects a break of NDN data transmission flow in a namespace (e.g., /alice/samplefile/filedata), the NDN forwarder may send a failure notification interest packet (e.g., with a corresponding name/alice/samplefile/fail) using one or more incoming face(s) of interest packets in the data namespace (e.g., /alice/samplefile/filedata). When an NDN forwarder in the NDN network receives a failure notification interest packet corresponding to the data namespace, if the NDN forwarder is not directly connected to the data consumer of NDN data in the namespace, the NDN forwarder may send the failure notification interest packet using incoming face(s) of interest packets in the namespace; or if the NDN forwarder is directly connected to the data consumer of NDN data packets in the namespace, a new forwarding path for the data namespace in the NDN network may be established using the burst-based route discovery process.

Figure 10:
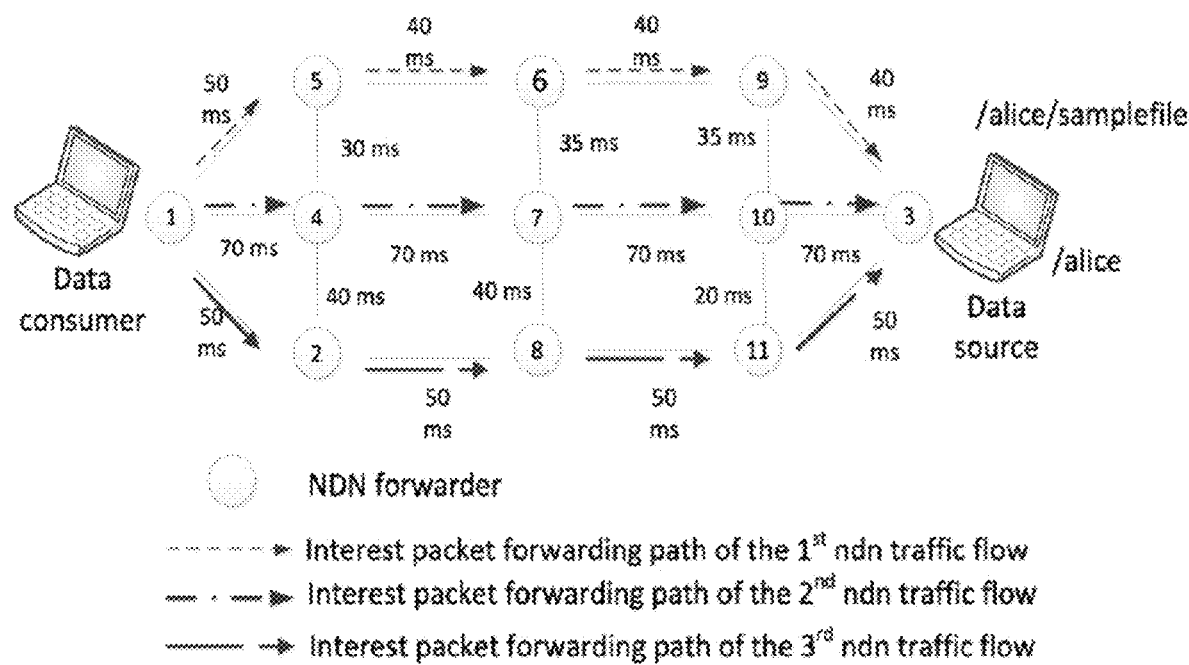
FIG. 10 depicts exemplary multi-flow NDN data transfer in a multi-path NDN networking environment according to various disclosed embodiments of the present disclosure.

FIG. 10 depicts exemplary multi-flow NDN data transfer in the multi-path NDN networking environment according to various disclosed embodiments of the present disclosure. For file transfer through the multi-path NDN network, simultaneous use of available throughput from multiple network routes between the data consumer and the data source(s) may greatly improve total throughput for data transfer. An exemplary method may be configured to establish multiple traffic flows for data transfer.

As illustrated in FIG. 10, multiple routes (e.g., 3 routes) in the NDN network may be simultaneously configured to send interest packets from the data consumer to the data source. Corresponding NDN data packets may then be sent back to the data consumer using all three network routes.

For the multi-flow NDN, at the data consumer side, all NDN data packets of the file (e.g., N named data packets) may be divided into multiple groups (e.g., four groups). A flowID field may be added to an interest packet before sending to the network. All interest packets belonging to a same group may be assigned with a same flowID. Establishment of multiple traffic flows for NDN data transfer is described according to various embodiments of the present disclosure hereinafter.

According to various embodiments of the present disclosure, establishing multiple flow for the NDN data transfer is described hereinafter.

At the NDN data consumer side, following exemplary processes may be implemented in various embodiments of the present disclosure.

In various embodiments of the present disclosure, the NDN data consumer may first establish the first NDN traffic flow to obtain data from the NDN data source. All NDN interest packets belonging to the first NDN traffic flow may be assigned with a flowID (e.g., 1) and sent to the NDN network. The first NDN traffic flow may use its own congestion control.

In various embodiments of the present disclosure, after the first NDN traffic flow is established and stabilized, for example, reaches a steady throughput, the data consumer side may try to establish the second NDN traffic flow for transferring NDN data. All NDN interest packets belonging to the second NDN traffic flow may be assigned with a flowID (e.g., 2) and sent to the NDN network. The second NDN traffic flow may use its own congestion control.

In various embodiments of the present disclosure, after the second NDN traffic flow is stabilized (e.g., in a steady throughput), the data consumer side may try to establish the third NDN traffic flow. All NDN interest packets belonging to the third flow may be assigned a flowID (e.g., 3) and sent to the NDN network. The third NDN traffic flow may use its own congestion control.

Figure 11:
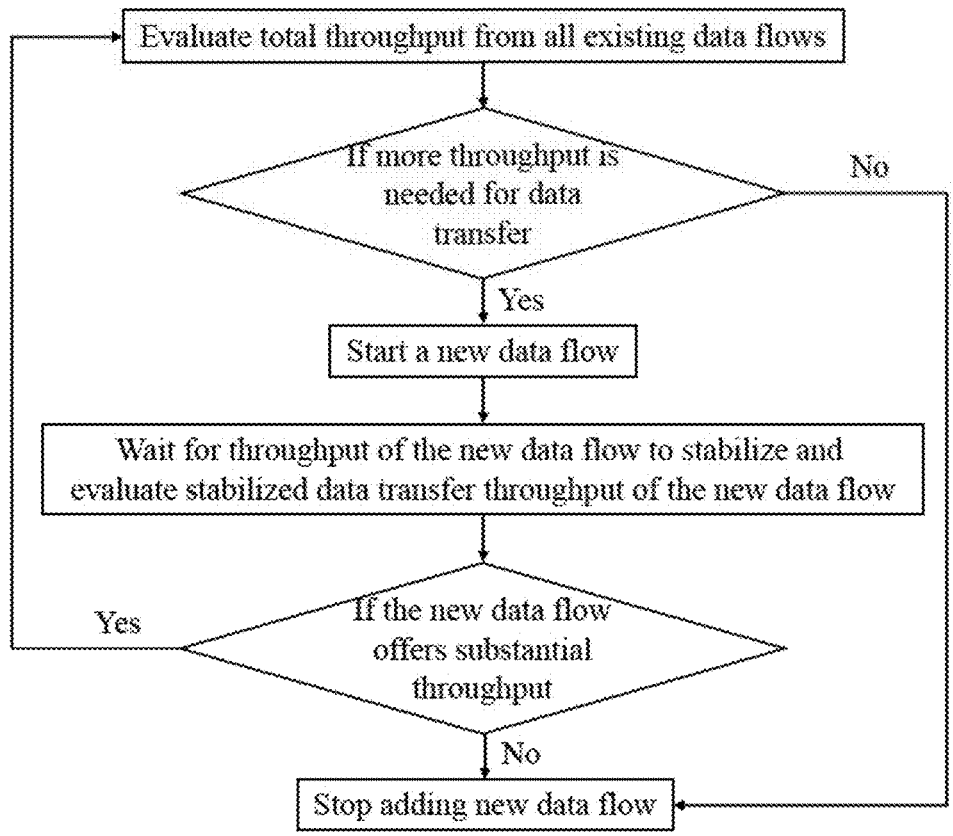
FIG. 11 depicts a flowchart of evaluating stabilized throughput levels of established traffic flows according to various disclosed embodiments of the present disclosure.

FIG. 11 depicts a flowchart of evaluating stabilized throughput levels of established traffic flows according to various disclosed embodiments of the present disclosure. Referring to FIG. 11, the data consumer may evaluate stabilized throughput levels from all established traffic flows for the file or data transfer. If more throughput is needed, a new flow may be started according to various embodiments of the present disclosure.

At an NDN forwarder, following exemplary processes may be implemented in various embodiments of the present disclosure.

According to various embodiments of the present disclosure, the NDN forwarder may receive an NDN interest packet belonging to an NDN traffic flow (e.g., with the flowID i, where i is a positive integer). If named data is not available in the content store of the NDN forwarder and if forwarding face is not determined for the NDN interest packet with the flowID i, the NDN forwarder may use a route discovery process, for example, the burst-based route discovery process, to determine the forwarding face for the namespace and flow ID. It should be noted that the route discovery processes for packets with same namespace and different flow IDs may be independent. When forwarding face has been determined for the ith flow, the NDN forwarder may send the interest packet to next network hop through the forwarding face. If named data is found in the content store of the NDN forwarder, named data may be sent back through the incoming face of the interest packet.

When established multi-flow NDN is configured to obtain a file, all data consumers should use same grouping configuration and flowID assignment, such that routing decisions at the NDN forwarders for the flowID may be used by all users. In addition, considering caching the NDN data packets by the NDN forwarders, the NDN data packets that belong to a same group may be cached by same forwarders along the route for corresponding flowID. The interest packets with the flowID sent by the data consumer may follow same network route determined for earlier data transmission and easily reach cached NDN data packets at forwarders in the network.

The multi-flow NDN data transfer may involve the use of the burst-based route discovery process which may determine the route in the NDN network that provides optimal or sufficient throughput improvement for data/file transfer from the NDN data source to the NDN data consumer. It should be noted that the multi-flow NDN data transfer may not guarantee using all available throughputs between the data consumer and the data source in the multi-path networking environment. To clearly illustrate above-mentioned NDN data transfer, a network topology, including four NDN nodes, are shown in FIGS. 12A-12G. FIGS. 12A-12G depict examples of a multi-path NDN network where all routes are found by sequential discovery of routes offering optimal network throughput according to various disclosed embodiments of the present disclosure. Network connection between the NDN nodes may have throughputs shown in FIGS. 12A-12G.

Figure 12A:
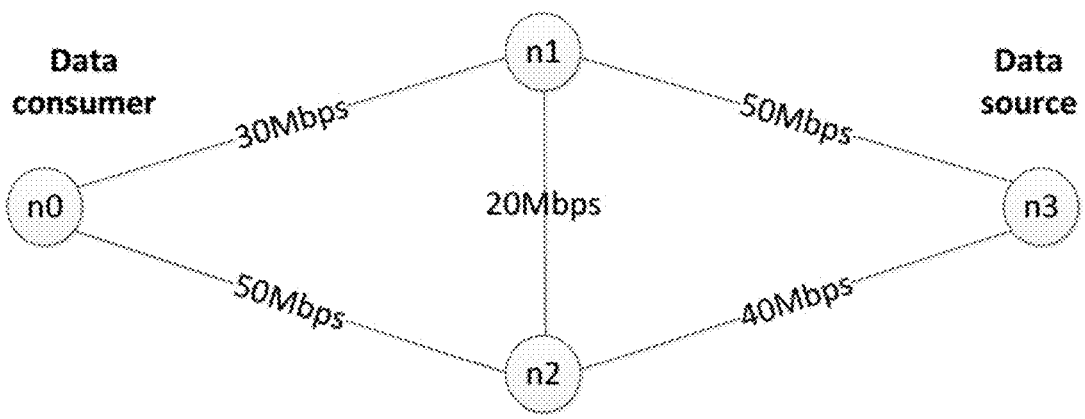
FIGS. 12A-12G depict examples of a multi-path NDN network where all routes are found by sequential discovery for offering optimal network throughput according to various disclosed embodiments of the present disclosure.
Figure 12B:
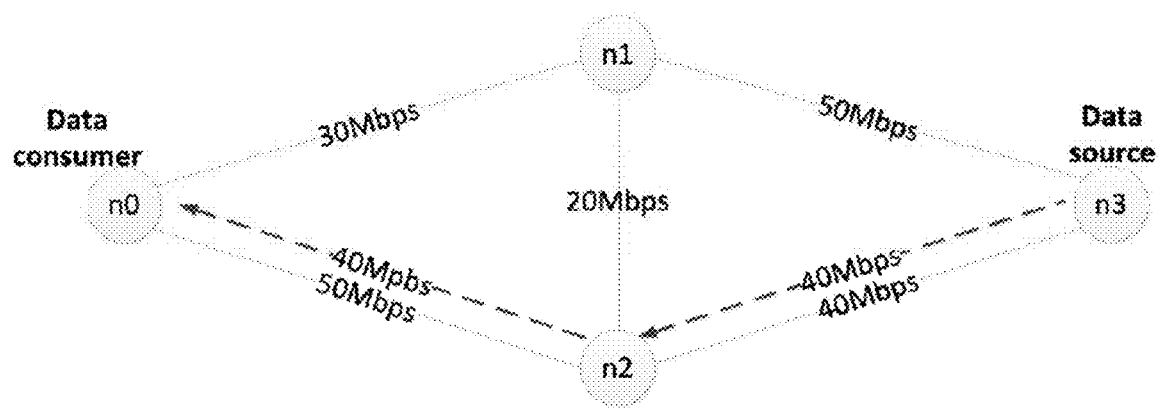
Figure 12C:
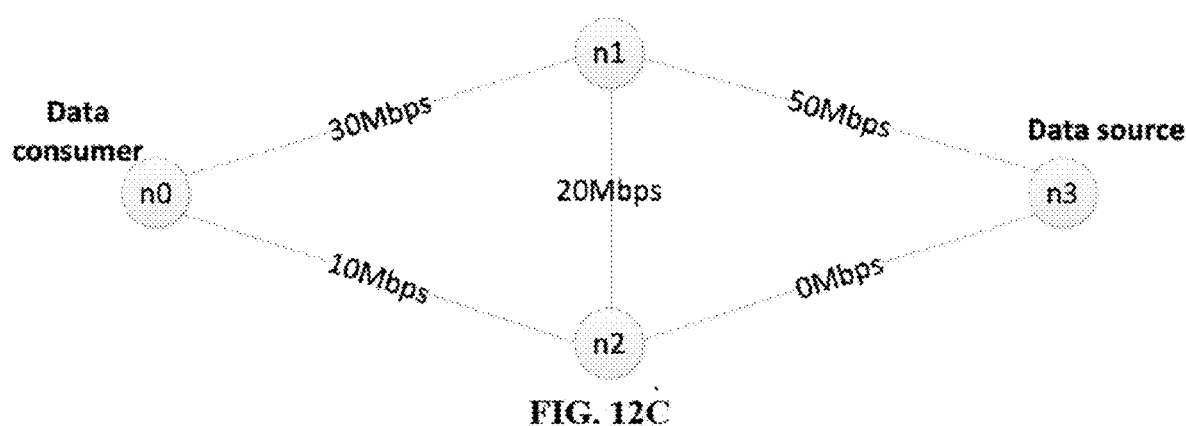
Figure 12D:
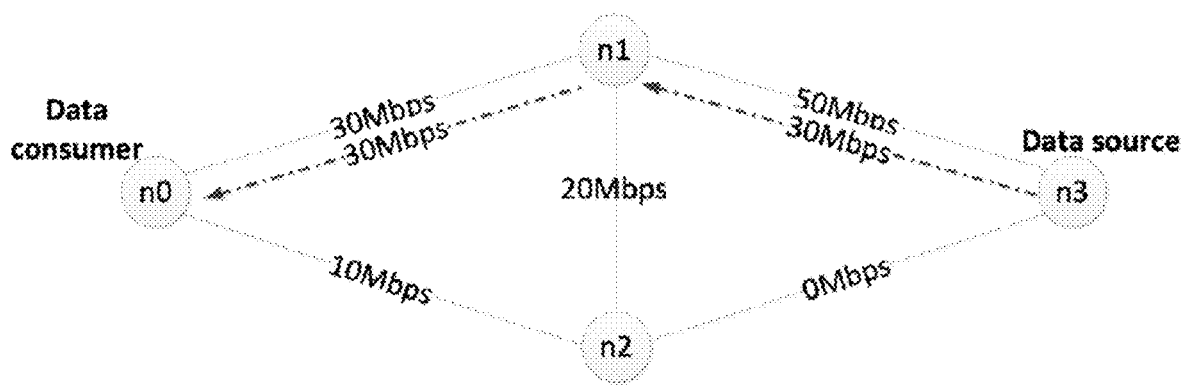
Figure 12E:
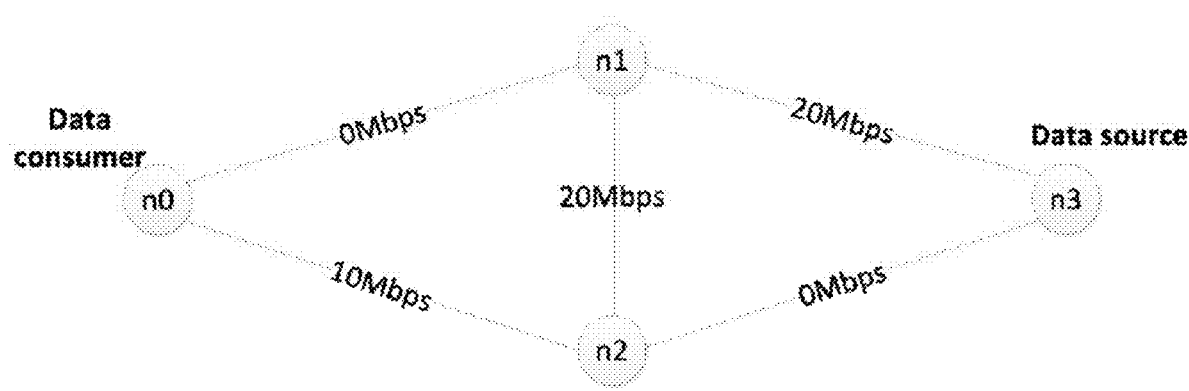
Figure 12F:
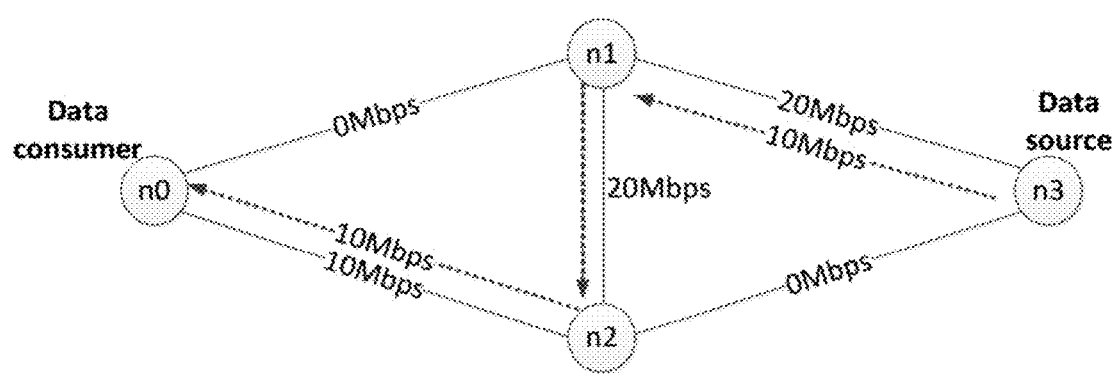
Figure 12G:
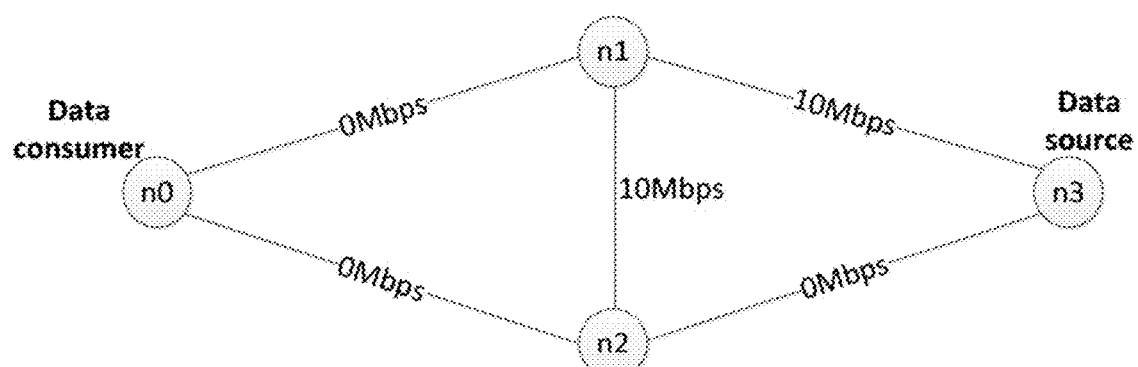

When above-mentioned multi-flow NDN approach is implemented, the FIGS. 12A-12G illustrate the flow establishment process and resulting route for each data flow, where n0, n1, n2 and n3 denote node no, node n1, node n2 and node n3 respectively. FIG. 12A illustrates the network topology and available throughputs of the connections before the first traffic flow is established. FIG. 12B illustrates a resulting route from the burst-based route discovery process. Referring to FIG. 12B, the route n3→n2→n0 may have the highest throughput for data transfer, which may offer 40 Mbps throughput. FIG. 12C illustrates available throughputs of the network connections after the first data flow has been established and reached its throughput limit, for example, 40 Mbps. After the data consumer side starts to establish the second data flow for more data transfer throughputs, FIG. 12D illustrates that the route determined by the burst-based route discovery process may be the route n3→n1→n0, which may offer an additional 30 Mbps throughput. FIG. 12E illustrates available throughputs of the network connections after the second data flow reached its throughput limit, for example, 30 Mbps. For more data transfer throughputs, the data consumer side may start to establish the third data flow. FIG. 12F illustrates the route determined by the burst-based route discovery process may be the route n3→n1→n2→n0, which may offer an additional 10 Mbps throughput. FIG. 12G illustrates remaining throughputs of the network connections after the third data flow reaches its throughput limit. It may be seen that no more route with additional throughput may be found using the burst-based route discovery process. If the data consumer side needs more data transfer throughput and starts another data flow, the new data flow may not offer any network throughput because the forwarders in the NDN network cannot discover an available route.

In the network condition as illustrated in FIGS. 12A-12G, multiple data flows may be sequentially established to utilize all available network throughputs between the data consumer and the data source for data transfer.

Figure 13A:
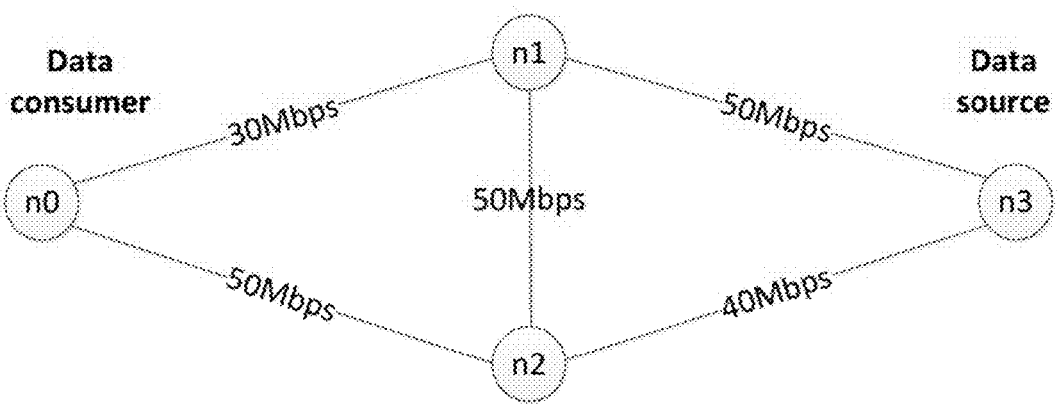
FIGS. 13A-13C depict examples of a multi-path NDN network where not all routes are found by sequential discovery of routes offering optimal network throughput according to various disclosed embodiments of the present disclosure.
Figure 13B:
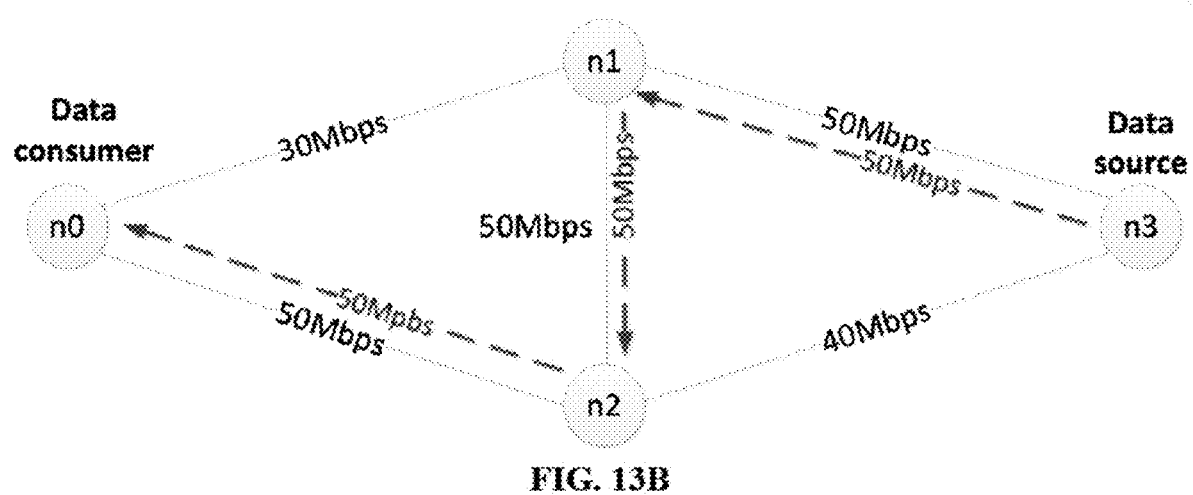
Figure 13C:
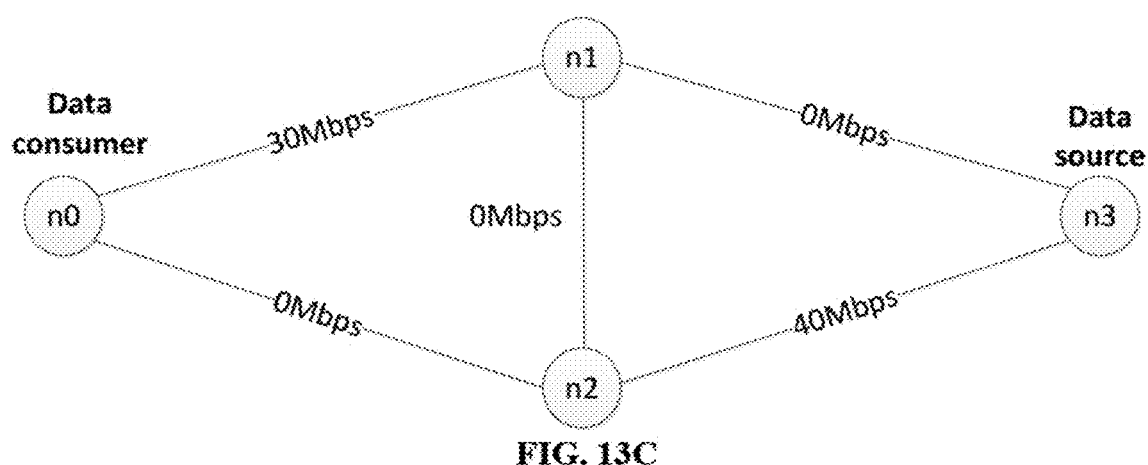

FIGS. 13A-13C depict examples of a multi-path NDN network where not all routes are found by sequential discovery of routes offering optimal network throughput according to various disclosed embodiments of the present disclosure.

According to various embodiments of the present disclosure, referring to a slightly changed case shown in FIGS. 13A-13C, throughput of the network connection between node n1 and node n2 may be changed from 20 Mbps to 50 Mbps. FIG. 13A illustrates the network topology and available throughputs of the connections before the first data flow is established. FIG. 13B illustrates the resulting route from the burst-based route discovery process. Referring to FIG. 13B, the route n3→n1→n2→n0 may have the highest throughput for data transfer, which may offer 50 Mbps throughput. FIG. 13C illustrates remaining throughputs of the network connections after the first data flow reaches its throughput limit. It may be seen that no more route with additional throughput may be found from the data consumer (node) to the data source (node) with the burst-based route discovery process. As a result, after establishing the first data flow using disclosed multi-flow NDN approach, no additional data flows may be established to offer additional network throughput. However, the network in FIGS. 13A-13C should provide same total throughput of 80 Mbps between node n0 and node n3 as in the network in FIGS. 12A-12G. The reason may be that data flows that have been established consume throughputs of network connections, which may limit the route discovery for new data flows.

According to various embodiments of the present disclosure, to solve above-mentioned problem, an enhanced multi-flow establishment process is provided for data transfer in multi-path networking environments.

At the data consumer, when a new data flow is found to have little or no network throughput (indicating no new route is found in the multi-path NDN network to offer additional throughput for data transfer), following process may be used by the data consumer side to establish new data flows for additional throughputs from the network. An established data flow may be selected first; the data transfer throughput of the selected data flow may be intentionally reduced by a certain amount (e.g., 5 Mbps) to release network throughput resources; a new data flow or data flows may be started using the process in FIG. 11; the throughput of the selected data flow may be further adjusted; and total network throughput achieved by all established data flows may be evaluated to determine if any improvement is achieved.

FIGS. 14A-14K depict examples of an enhanced multi-flow establishment process according to various disclosed embodiments of the present disclosure.

Figure 14A:
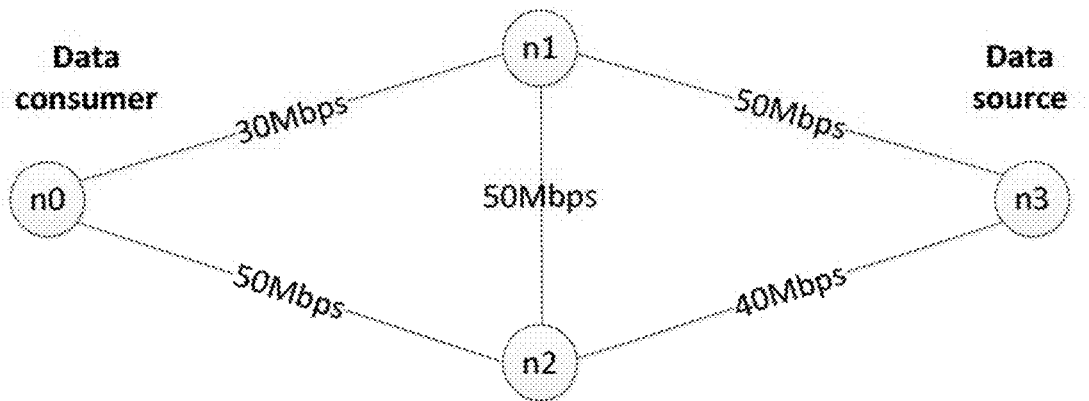
FIGS. 14A-14K depict examples of an enhanced multi-flow establishment process according to various disclosed embodiments of the present disclosure.
Figure 14B:
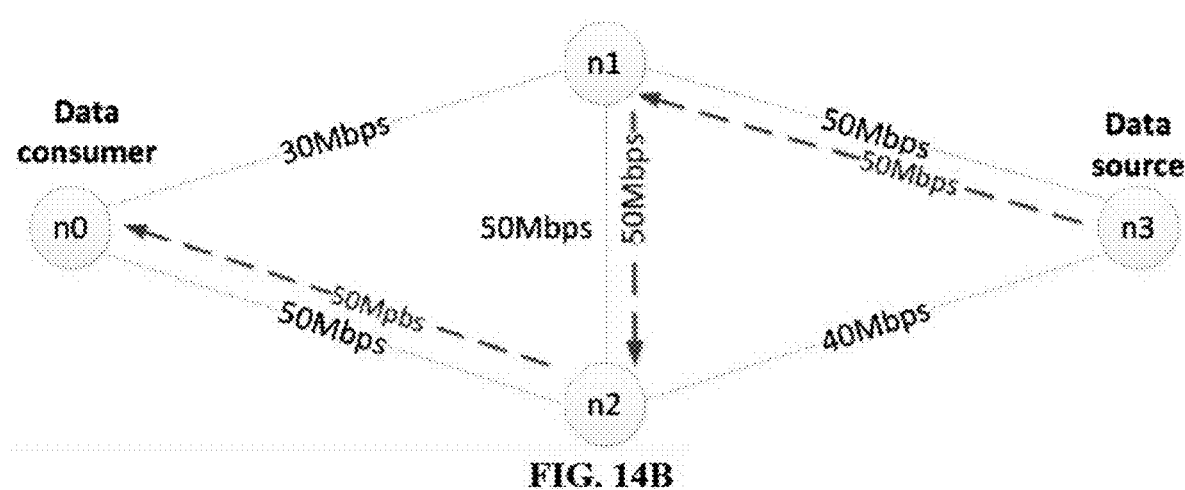
Figure 14C:
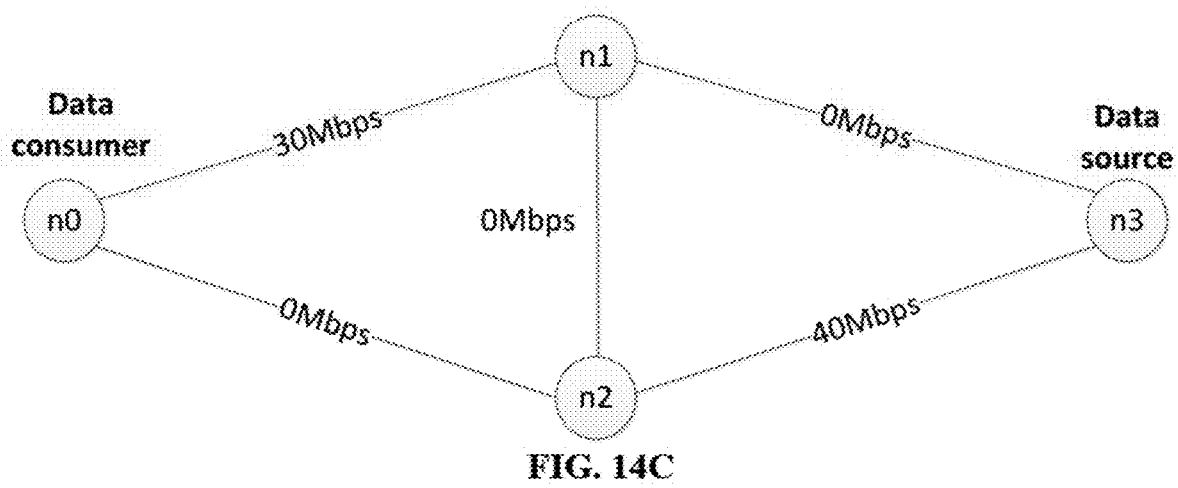

FIGS. 14A-14K illustrates the enhanced data flow establishment process for same multi-path NDN network as in FIGS. 13A-13C. The steps in FIGS. 14A-14C may be same as the steps in FIGS. 13A-13C. Referring to FIG. 14C, three network connections may have no available throughputs after the first data flow (using the route n3→n1→n2→n0) reaches its throughput limit (i.e., 50 Mbps); and no more routes may be found. The burst-based route discovery process may be configured to provide additional network throughput between node n0 and node n3.

Figure 14D:
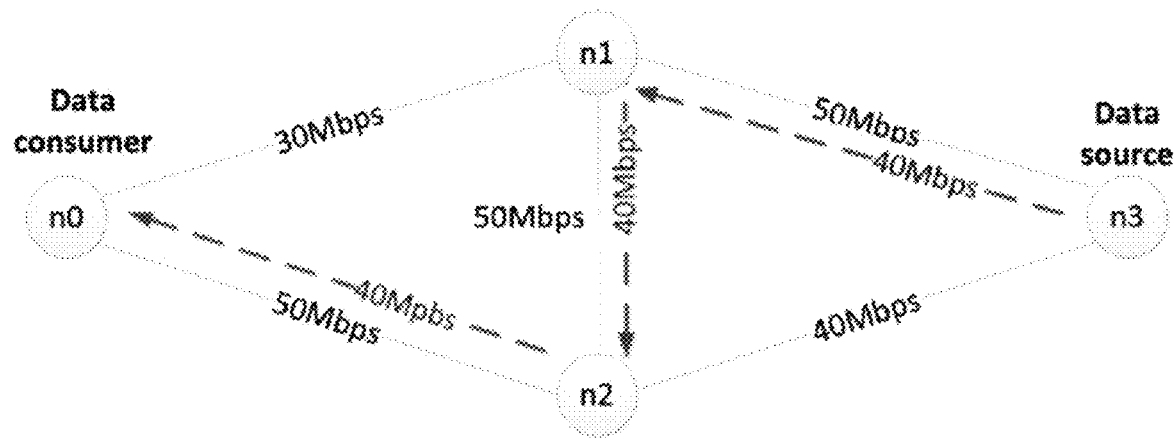
Figure 14E:
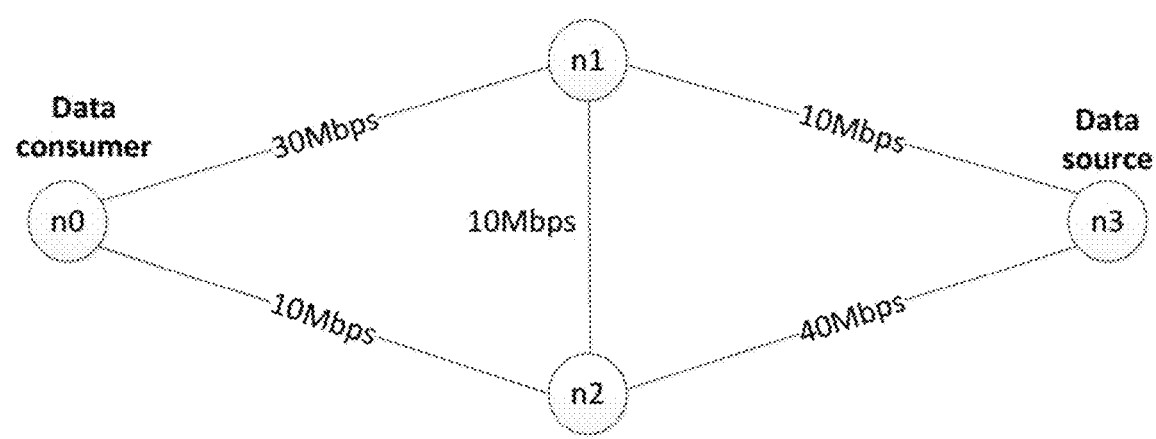

As illustrated in FIG. 14D, the throughput of the first data flow (established) may be reduced to 40 Mbps from the 50 Mbps limit, thereby releasing throughputs of the network connections in the route of the first data flow (i.e., n3→n1→n2→n0). FIG. 14E illustrates remaining throughputs of the network connections after the throughput of the first data flow is intentionally reduced to 40 Mbps.

Figure 14F:
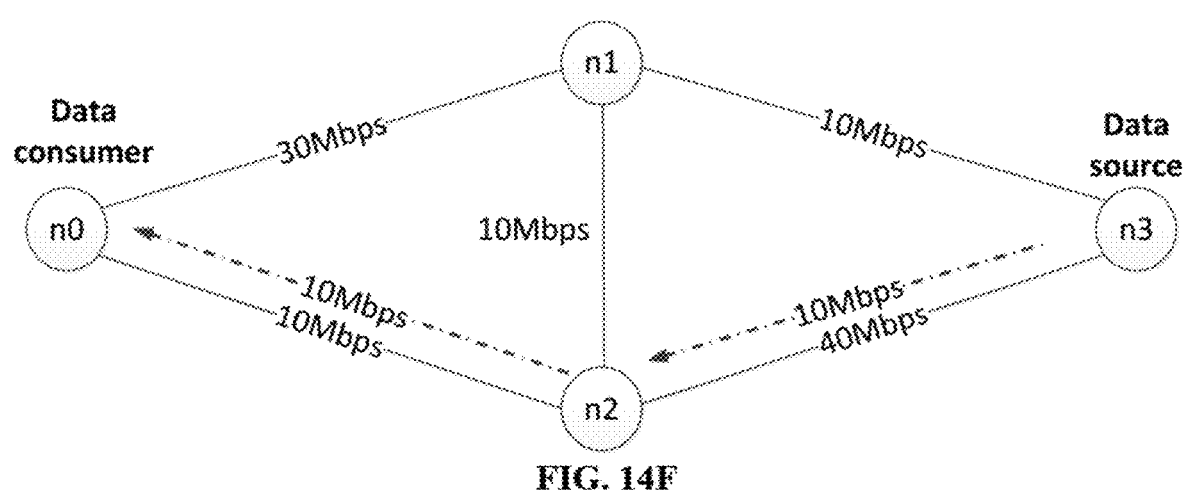
Figure 14G:
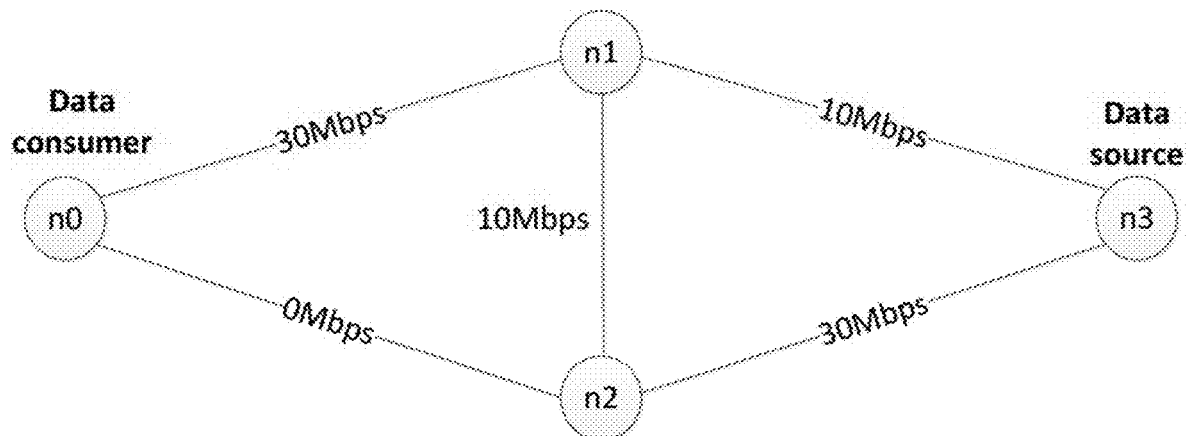
Figure 14H:
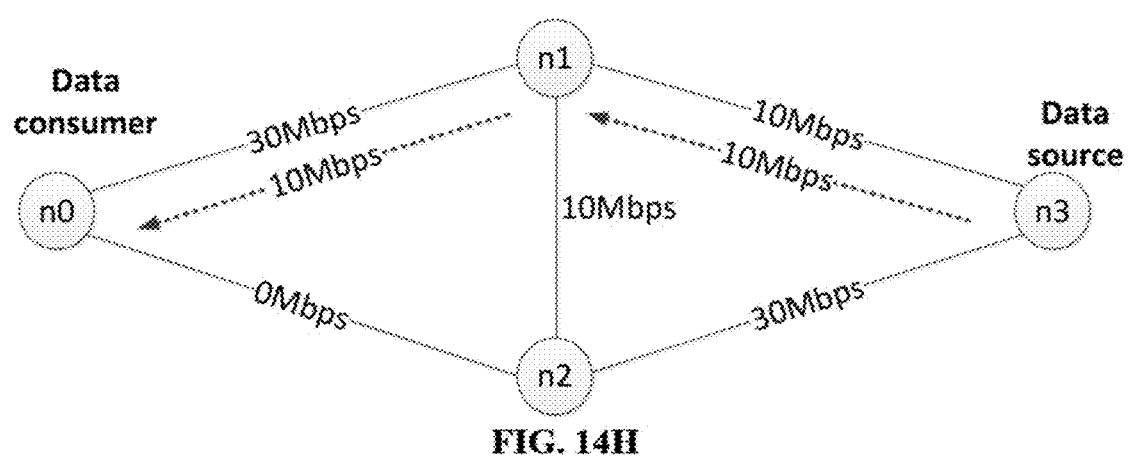
Figure 14I:
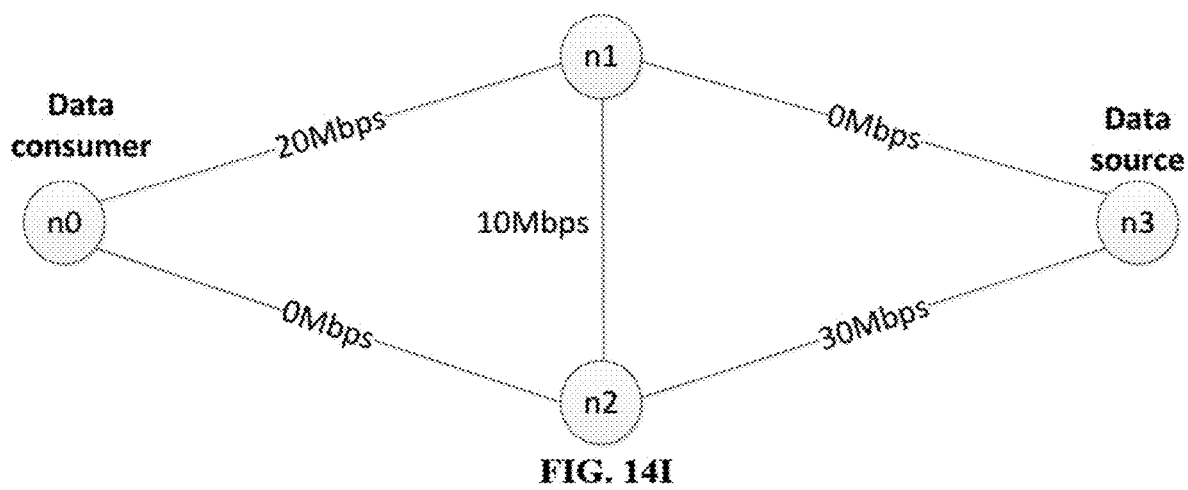
Figure 14J:
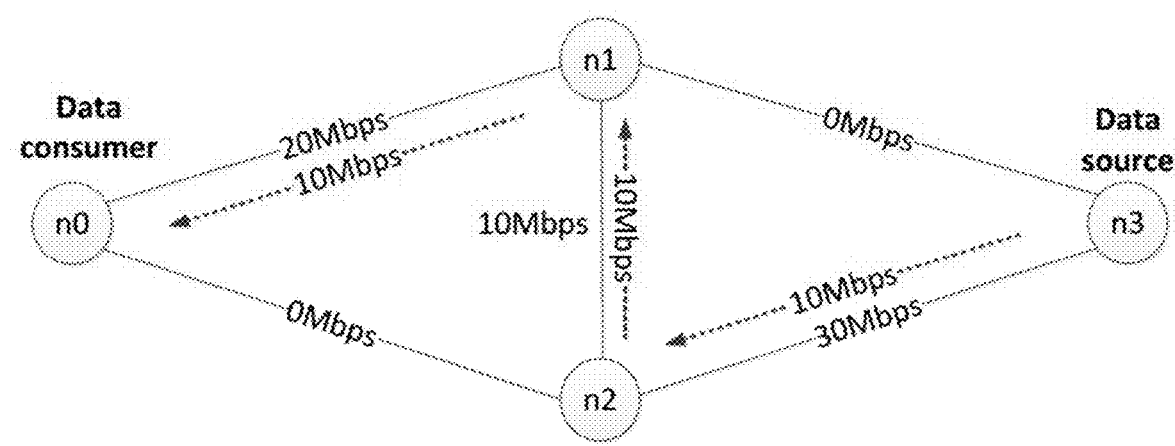
Figure 14K:
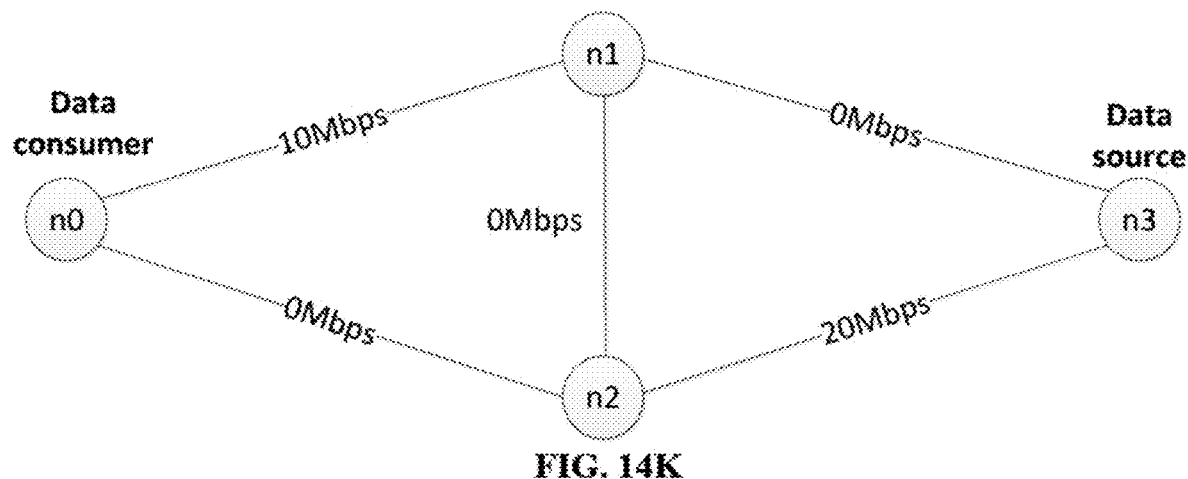

FIGS. 14F-14K illustrate the process of establishing additional data flows using the process in FIG. 11, which may start from the network condition with remaining throughputs of the network connections in FIG. 14E. FIG. 14F illustrates a new (i.e., second) data flow may be established, where the second data flow may use a new route (i.e., n3→n2→n0, determined by the burst-based route discovery process) and provide 10 Mbps throughput. FIG. 14G illustrates remaining throughputs of the network connections after the second data flow reaches its limit (i.e., 10 Mbps). FIG. 14H illustrates the third data flow may be established, where the third data flow may use a new route (i.e., n3→n1→n0, determined by the burst-based route discovery process) and provide 10 Mbps throughput. FIG. 14I illustrate remaining throughputs of the network connections after the third data flow reaches its limit (i.e., 10 Mbps). FIG. 14J illustrates the fourth data flow may be established, where the fourth data flow may use a new route (i.e., n3→n2→n1→n0, determined by the burst-based route discovery process) and provide 10 Mbps throughput. FIG. 14K illustrates remaining throughputs of the network connections after the fourth data flow reaches its limit (i.e., 10 Mbps). It may be noted that no new route may be found (e.g., using the burst-based route discovery process) that may offer additional network throughput from the data source to the data consumer. At this point, all routes between the data source node and the data consumer node may have been used by established data flows. Furthermore, it should be noted that after the throughput of the first data flow is intentionally reduced to 40 Mbps, three more data flows may be established. In one embodiment, four data flows may provide total throughput of 70 Mbps.

In one embodiment, by further reducing the throughput of the first data flow by 10 Mbps, the second data flow (using route n3→n2→n0) and the third data flow (using route n3→n1→n0) may increase corresponding throughputs by 10 Mbps. After such throughput adjustment, total network throughput may be 80 Mbps. The network topology and network connection throughputs may not be known by the data consumer and the NDN forwarders. Data flow throughput controls (e.g., intentionally decreasing or increasing the throughput of an established data flow) to improve total network throughput may be obtained by trial and error.

According to various embodiments of the present disclosure, the burst-based process may be used for effective discovery of network routes to the NDN data source(s) that provides high network throughputs. The use of the probing method may allow the discovery of multiple routes to one or more NDN data sources for data transfer. As a result, available network throughputs in the multi-path NDN overlay network may be effectively utilized to achieve enhanced network throughput.

Various embodiments of the present disclosure further provide a method of a burst-based route discovery process for establishing a forwarding path for forwarding interest packets in a namespace from a data consumer to a data source through an NDN network, where the NDN network includes interconnected NDN forwarders. The method includes sending a probing interest packet, using a probing name for the namespace to the NDN network, by one of the NDN forwarders which is directly connected to the data consumer of NDN data in the namespace; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Various embodiments of the present disclosure further provide a device for a burst-based route discovery process. The device includes a memory, configured to store program instructions for performing a method of a burst-based route discovery process for establishing a forwarding path for forwarding interest packets in a namespace from the data consumer to a data source through an NDN network; and a processor, coupled with the memory and, when executing the program instructions, configured for: sending, by the data consumer, a probing interest packet using a probing name for the namespace to the NDN network, where the NDN network includes interconnected NDN forwarders; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Various embodiments of the present disclosure further provide a non-transitory computer-readable storage medium, containing program instructions for, when being executed by a processor, performing a method of a burst-based route discovery process for establishing a forwarding path for forwarding interest packets in a namespace from the data consumer to a data source through an NDN network. The method includes sending, by the data consumer, a probing interest packet using a probing name for the namespace to the NDN network, where the NDN network includes interconnected NDN forwarders; when one NDN forwarder, which is not the data source or not directly connected to the data source in the NDN network, receives the probing interest packet from one face of the one NDN forwarder, sending, by the one NDN forwarder, the probing interest packet to neighboring NDN forwarders; after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, where K is a positive integer; as the burst of K probing data packets being received by an NDN forwarder which is not the data source or not directly connected to the data source from a face of the NDN forwarder, evaluating one or more gaps between arrival times of the burst of K probing data packets received; determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, where the burst of K probing data packets is sent in a manner such that one or more sending time gaps between the burst of K probing data packets are consistent with the one or more gaps between the arrival times of the burst of K probing data packets.

Embodiments disclosed herein may be exemplary only. Other applications, advantages, alternations, modifications, or equivalents to the disclosed embodiments may be obvious to those skilled in the art and be intended to be encompassed within the scope of the present disclosure.

What is claimed is:

1. A method of a burst-based route discovery process for establishing a forwarding path for forwarding interest packets in a namespace from a data consumer to a data source through a named data networking (NDN) network, comprising:
    sending, by the data consumer, a probing interest packet using a probing name for the namespace to the NDN network, wherein the NDN network includes interconnected NDN forwarders;
    when one NDN forwarder, which is not the data source or not directly connected to the data source in the NDN network, receives the probing interest packet from one face of the one NDN forwarder, sending, by the one NDN forwarder, the probing interest packet to neighboring NDN forwarders;
    after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, wherein K is a positive integer;
    as the burst of K probing data packets being received by an NDN forwarder which is not the data source or not directly connected to the data source from a face of the NDN forwarder, evaluating one or more gaps between arrival times of the burst of K probing data packets received;
    determining an available network throughput level of the face of the NDN forwarder based on the one or more gaps between the arrival times of the burst of K probing data packets received; and
    if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, wherein the burst of K probing data packets is sent in a manner such that one or more sending time gaps between the burst of K probing data packets are consistent with the one or more gaps between the arrival times of the burst of K probing data packets.

2. The method according to claim 1, wherein evaluating the one or more gaps between the arrival times of the burst of K probing data packets received includes:
    calculating a gap between an arrival time of a first packet and an arrival time of a last packet of the burst of K probing data packets.

3. The method according to claim 1, wherein:
    if the burst of K probing data packets is delayed to a time duration, the forwarding path for forwarding the interest packets is not updated.

4. The method according to claim 1, wherein:
    a large gap between the arrival times of the burst of K probing data packets indicates a low available network throughput level from the data source to the NDN forwarder; and a small gap between the arrival times of the burst of K probing data packets indicates a high available network throughput level from the data source to the NDN forwarder.

5. A method of a burst-based route discovery process for establishing a forwarding path for forwarding interest packets in a namespace from a data consumer to a data source through a named data networking (NDN) network, wherein the NDN network includes interconnected NDN forwarders, the method comprising:
    sending a probing interest packet, using a probing name for the namespace to the NDN network, by one of the NDN forwarders which is directly connected to the data consumer of NDN data in the namespace;
    when one NDN forwarder, which is not the data source or not directly connected to the data source in the NDN network, receives the probing interest packet from one face of the one NDN forwarder, sending, by the one NDN forwarder, the probing interest packet to neighboring NDN forwarders;

after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, wherein K is a positive integer;

as the burst of K probing data packets being received by an NDN forwarder which is not the data source or not directly connected to the data source from a face of the NDN forwarder, evaluating one or more gaps between arrival times of the burst of K probing data packets received;

determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, wherein the burst of K probing data packets is sent in a manner such that one or more sending time gaps between the burst of K probing data packets are consistent with the one or more gaps between the arrival times of the burst of K probing data packets.

6. The method according to claim 5, wherein evaluating the one or more gaps between the arrival times of the burst of K probing data packets received includes:
calculating a gap between an arrival time of a first packet and an arrival time of a last packet of the burst of K probing data packets.

7. The method according to claim 5, wherein:
if the burst of K probing data packets is delayed to a time duration, the forwarding path for forwarding the interest packets is not updated.

8. The method according to claim 5, wherein:
a large gap between the arrival times of the burst of K probing data packets indicates a low available network throughput level from the data source to the NDN forwarder; and a small gap between the arrival times of the burst of K probing data packets indicates a high available network throughput level from the data source to the NDN forwarder.

9. A method for recovering named data networking (NDN) data transmission in a namespace in an NDN network when an NDN forwarder detects a break of a data transmission flow in the namespace, the method comprising:
sending by the NDN forwarder, which detects the break of the data transmission flow, a failure notification interest packet corresponding to the namespace using one or more faces of the NDN forwarder from which interest packets in the namespace are received; and when one of NDN forwarders in the NDN network receives the failure notification interest packet corresponding to the namespace, if the one of the NDN forwarders is not directly connected to a data consumer of NDN data in the namespace, sending, by the one of the NDN forwarders, the failure notification interest packet using one or more faces of the one of the NDN forwarders from which interest packets in the namespace are received; or if the one of the NDN forwarders is directly connected to a data consumer of NDN data packets in the namespace, establishing a new forwarding path for the namespace in the NDN network.

10. The method according to claim 9, wherein establishing the new forwarding path for the namespace in the NDN network includes:
sending a probing interest packet, using a probing name for the namespace to the NDN network, by the one of the NDN forwarders which is directly connected to the data consumer of NDN data in the namespace;

when one NDN forwarder, which is not a data source or not directly connected to the data source in the NDN network, receives the probing interest packet from one face of the one NDN forwarder, sending, by the one NDN forwarder, the probing interest packet to neighboring NDN forwarders;

after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, wherein K is a positive integer;

as the burst of K probing data packets being received by another NDN forwarder which is not the data source or not directly connected to the data source from a face of the another NDN forwarder, evaluating one or more gaps between arrival times of the burst of K probing data packets received;

determining an available network throughput level of the face of the another NDN forwarder based on the one or more gaps between the arrival times of the burst of K probing data packets received; and if determined available network throughput level of the face of the another NDN forwarder indicates a predefined increase in network throughput comparing to a previously determined available network throughput level of a current face of the another NDN forwarder configured for forwarding the interest packets in the namespace, setting the face of the another NDN forwarder for the burst of K probing data packets received as a face of the another NDN forwarder for forwarding the interest packets in the namespace; and sending the burst of K probing data packets to neighboring NDN forwarders, wherein the burst of K probing data packets is sent in a manner such that one or more sending time gaps between the burst of K probing data packets are consistent with the one or more gaps between the arrival times of the burst of K probing data packets.

11. A device of a burst-based route discovery process, comprising:
a memory, configured to store program instructions for performing a method of the burst-based route discovery process for establishing a forwarding path for forwarding interest packets in a namespace from a data consumer to a data source through a named data networking (NDN) network; and a processor, coupled with the memory and, when executing the program instructions, configured for:

sending, by the data consumer, a probing interest packet using a probing name for the namespace to the NDN network, wherein the NDN network includes interconnected NDN forwarders;

when one NDN forwarder, which is not the data source or not directly connected to the data source in the NDN network, receives the probing interest packet from one face of the one NDN forwarder, sending, by the one NDN forwarder, the probing interest packet to neighboring NDN forwarders;

after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, wherein K is a positive integer;

as the burst of K probing data packets being received by an NDN forwarder which is not the data source or not directly connected to the data source from a face of the NDN forwarder, evaluating one or more gaps between arrival times of the burst of K probing data packets received;

determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, wherein the burst of K probing data packets is sent in a manner such that one or more sending time gaps between the burst of K probing data packets are consistent with the one or more gaps between the arrival times of the burst of K probing data packets.

12. The device according to claim 11, wherein evaluating the one or more gaps between the arrival times of the burst of K probing data packets received includes:
calculating a gap between an arrival time of a first packet and an arrival time of a last packet of the burst of K probing data packets.

13. The device according to claim 11, wherein:
if the burst of K probing data packets is delayed to a time duration, the forwarding path for forwarding the interest packets is not updated.

14. The device according to claim 11, wherein:
a large gap between the arrival times of the burst of K probing data packets indicates a low available network throughput level from the data source to the NDN forwarder; and a small gap between the arrival times of the burst of K probing data packets indicates a high available network throughput level from the data source to the NDN forwarder.

15. A non-transitory computer-readable storage medium, containing program instructions for, when being executed by a processor, performing a method of a burst-based route discovery process for establishing a forwarding path for forwarding interest packets in a namespace from a data consumer to a data source through a named data networking (NDN) network, the method comprising:

sending, by the data consumer, a probing interest packet using a probing name for the namespace to the NDN network, wherein the NDN network includes interconnected NDN forwarders;

when one NDN forwarder, which is not the data source or not directly connected to the data source in the NDN network, receives the probing interest packet from one face of the one NDN forwarder, sending, by the one NDN forwarder, the probing interest packet to neighboring NDN forwarders;

after anyone NDN forwarder, which is the data source or directly connected to the data source, receives the probing interest packet through one face of the anyone NDN forwarder, sending back, by the anyone NDN forwarder, a burst of K probing data packets corresponding to the probing interest packet using the one face of the anyone NDN forwarder, wherein K is a positive integer;

as the burst of K probing data packets being received by an NDN forwarder which is not the data source or not directly connected to the data source from a face of the NDN forwarder, evaluating one or more gaps between arrival times of the burst of K probing data packets received;

determining an available network throughput level of the face of the NDN forwarder based on the one or more gaps between the arrival times of the burst of K probing data packets received; and if determined available network throughput level of the face of the NDN forwarder indicates a predefined increase in network throughput comparing to a previously determined available network throughput level of a current face of the NDN forwarder configured for forwarding the interest packets in the namespace, setting the face of the NDN forwarder for the burst of K probing data packets received as a face of the NDN forwarder for forwarding the interest packets in the namespace; and sending the burst of K probing data packets to neighboring NDN forwarders, wherein the burst of K probing data packets is sent in a manner such that one or more sending time gaps between the burst of K probing data packets are consistent with the one or more gaps between the arrival times of the burst of K probing data packets.

16. The storage medium according to claim 15, wherein evaluating the one or more gaps between the arrival times of the burst of K probing data packets received includes:
calculating a gap between an arrival time of a first packet and an arrival time of a last packet of the burst of K probing data packets.

17. The storage medium according to claim 15, wherein:
if the burst of K probing data packets is delayed to a time duration, the forwarding path for forwarding the interest packets is not updated.

18. The storage medium according to claim 15, wherein:
a large gap between the arrival times of the burst of K probing data packets indicates a low available network throughput level from the data source to the NDN forwarder, and a small gap between the arrival times of the burst of K probing data packets indicates a high available network throughput level from the data source to the NDN forwarder.

* * * * *